United States Patent
Ito

(10) Patent No.: US 7,010,172 B1
(45) Date of Patent: Mar. 7, 2006

(54) IMAGE ACQUIRING METHOD, IMAGE PROCESSING METHOD, AND IMAGE TRANSFORMING METHOD

(75) Inventor: Wataru Ito, Kaisei-machi (JP)

(73) Assignee: Fuji Photo Film Co., Ltd., Kanagawa-Ken (JP)

(*) Notice: Subject to any disclaimer, the term of this patent is extended or adjusted under 35 U.S.C. 154(b) by 704 days.

(21) Appl. No.: 09/627,062

(22) Filed: Jul. 27, 2000

(30) Foreign Application Priority Data

| Jul. 27, 1999 | (JP) | ................................. 11-212201 |
| Aug. 19, 1999 | (JP) | ................................. 11-232674 |
| May 26, 2000 | (JP) | ............................ 2000-155648 |
| May 26, 2000 | (JP) | ............................ 2000-155687 |
| May 26, 2000 | (JP) | ............................ 2000-155703 |

(51) Int. Cl.
G06K 9/40 (2006.01)

(52) U.S. Cl. .................. 382/260; 348/399.1; 358/532; 708/300

(58) Field of Classification Search ................ 382/260, 382/261, 262, 263; 348/272, 274, 275, 277, 348/278, 279, 280
See application file for complete search history.

(56) References Cited

U.S. PATENT DOCUMENTS

| 6,097,847 A * | 8/2000 | Inoue ......................... 382/266 |
| 6,181,376 B1 * | 1/2001 | Rashkovskiy et al. ...... 348/273 |
| 6,188,804 B1 * | 2/2001 | Weldy et al. ................ 382/300 |
| 6,295,087 B1 * | 9/2001 | Nohda ......................... 348/234 |
| 6,295,322 B1 * | 9/2001 | Arbeiter et al. ......... 375/240.29 |
| 6,563,538 B1 * | 5/2003 | Utagawa ...................... 348/273 |

FOREIGN PATENT DOCUMENTS

| JP | A5145857 | 6/1993 |
| JP | 10-191246 | 7/1998 |

* cited by examiner

*Primary Examiner*—Samir Ahmed
*Assistant Examiner*—Anand Bhatnagar
(74) *Attorney, Agent, or Firm*—Birch, Stewart, Kolasch & Birch, LLP

(57) ABSTRACT

An image is picked up through sampling in a predetermined sampling pattern to acquire an image signal representing the image. Sampling information, which concerns the predetermined sampling pattern, is appended to the image signal, which has been acquired. The sampling information is information for discriminating checkered sampling and square sampling from each other. Different sharpness enhancement processing is performed on the image signal and in accordance with the sampling information to obtain a processed image signal. The different sharpness enhancement processing may be a processing in accordance with frequency characteristics of the image signal, which has been acquired, due to the sampling pattern.

8 Claims, 14 Drawing Sheets

IMAGE ACQUIRING METHOD, IMAGE PROCESSING METHOD, AND IMAGE TRANSFORMING METHOD

BACKGROUND OF THE INVENTION

1. Field of the Invention

This invention relates to an image acquiring method and apparatus, wherein an image is picked up through checkered sampling or square sampling, and an image signal representing the image is thereby acquired. This invention also relates to an image processing method and apparatus, wherein sharpness enhancement processing is performed on the image signal. This invention further relates to an image transforming method and apparatus, wherein transforming processing is performed on a square sampling image signal, which has been obtained by transforming a checkered sampling image signal. This invention still further relates to an image transforming method and apparatus, wherein a checkered sampling image signal is transformed into a square sampling image signal. This invention also relates to a recording medium, on which a program for causing a computer to execute one of the methods has been recorded and from which the computer is capable of reading the program.

2. Description of the Related Art

With digital electronic still cameras (hereinbelow referred to as the digital cameras), an image having been acquired from a photographing operation is stored as a digital image signal on a recording medium, such as an internal memory located within the digital camera or an IC card. Image processing, such as gradation processing or sharpness enhancement processing, may then be performed on the digital image signal to obtain a processed image signal, and the thus obtained processed image signal may be utilized for reproducing the image, which was acquired from the photographing operation, as a hard copy, such as a print, or a soft copy on a display device. In cases where the images having been acquired with the digital cameras are reproduced in the manner described above, it is desired that images having image quality as good as the image quality of photographs printed from negative film be obtained. Therefore, a novel image reproducing technique has been proposed in, for example, Japanese Unexamined Patent Publication No. 10(1998)-191246. With the proposed image reproducing technique, information giving specifics about a photographing operation, such as the presence or absence of strobe light or the kind of illumination utilized at the time of the image acquisition, is appended to an image signal having been acquired with a digital camera, and the image signal appended with the information giving specifics about the photographing operation is fed out from the digital camera. Also, with the proposed image reproducing technique, when image processing is to be performed on the image signal, reference is made to the information giving specifics about the photographing operation, which information has been appended to the image signal, and appropriate image processing is performed on the image signal.

In order for an image signal to be acquired with digital cameras or scanners, it is necessary for the image to be picked up through sampling in a predetermined sampling pattern. As the sampling in a predetermined sampling pattern for the image acquisition, checkered sampling has heretofore been known. FIG. 3 is an explanatory view showing a pixel array of pixels represented by image signal components of a checkered sampling image signal, i.e. an image signal acquired through checkered sampling. With the checkered sampling, the image is acquired such that the pixel positions in the pixel array shown in FIG. 3, which are indicated by the "O" mark, have signal values, and the pixel positions indicated by the "X" mark (hereinbelow referred to also as the empty pixel positions) have no signal value. FIG. 18A is an explanatory view showing a pixel array employed in checkered sampling. Actually, in the checkered sampling, pixels are arrayed in the pattern shown in FIG. 18A. FIG. 18B is an explanatory view showing a pixel array employed in square sampling. When the pixel array shown in FIG. 18A and the pixel array shown in FIG. 18B are compared with each other, the pixel density in the pixel array shown in FIG. 18A becomes higher than the pixel density in the pixel array shown in FIG. 18B. Therefore, in cases where the area for the image pickup is the same, with the pixel array shown in FIG. 18A, a larger amount of information can be obtained than with the pixel array shown in FIG. 18B. A checkered sampling image signal, i.e. an image signal acquired through the checkered sampling, can be obtained by, for example, performing the photographing operation with a digital camera provided with a charge coupled device (CCD) image sensor, which comprises photoelectric conversion devices arrayed in a checkered pattern. The checkered sampling image signal can also be acquired with a digital camera provided with a CCD image sensor, which comprises photoelectric conversion devices arrayed in a square pattern, by obtaining a first image signal with a single photographing operation, then rotating the CCD image sensor to an oblique direction by an angle of 45 degrees, and obtaining a second image signal in this state. The checkered sampling image signal can further be acquired by sampling the image signal components of an image signal, which has been obtained with a CCD image sensor comprising photoelectric conversion devices arrayed in a square pattern, in a checkered sampling pattern.

However, image output devices for outputting images on image output media, such as a cathode ray tube (CRT) monitor or printing paper, are designed so as to process a square sampling image signal, i.e. an image signal acquired through the square sampling, which has signal values at all of the pixel positions indicated by the "O" mark and the "X" mark in the pixel array shown in FIG. 3. Also, image processing units for performing the image processing, such as the sharpness enhancement processing, on image signals are designed so as to process square sampling image signals. Particularly, in the sharpness enhancement processing, processing appropriate for the square sampling image signal is performed, wherein the processing with respect to the vertical direction of an image and the processing with respect to the horizontal direction of an image can be separated from each other. Therefore, heretofore, with respect to the checkered sampling image signal, signal values corresponding to the pixel positions indicated by the "X" mark are calculated by performing interpolating operations on the signal values corresponding to the pixel positions indicated by the "O" mark, the checkered sampling image signal is thereby transformed into the square sampling image signal, and thereafter the image output or the image processing is performed in accordance with the thus obtained square sampling image signal.

In cases where frequency characteristics of the checkered sampling image signal are represented in two-dimensional directions, the frequency characteristics may be represented as a rhombic response illustrated in FIG. 19A. Also, the frequency characteristics of the square sampling image signal may be represented as a rectangular response illustrated in FIG. 19B. In FIG. 19B, fs/2 represents a Nyquist frequency of the square sampling image signal. Also, in FIGS. 19A and 19B, image-reproducible frequency bands are indicated by the solid lines. In cases where the checkered sampling image signal is transformed into the square sampling image signal, the frequency characteristics, which express the original image information, do not alter from the frequency characteristics shown in FIG. 19A. Therefore, if the sharpness enhancement processing, which can be separated with respect to the vertical direction and the horizontal direction of the image, is performed on the checkered sampling image signal in the same manner as that for the square sampling image signal, the frequency bands originally having no image information, which are indicated by the hatching in FIG. 19B, will be enhanced, and therefore noise will occur. As a result, the image quality of an image obtained by performing the processing will become bad.

As a technique for transforming a checkered sampling image signal to a square sampling image signal, a technique has been proposed in, for example, Japanese Unexamined Patent Publication No. 5(1993)-145857, wherein microlenses arrayed in a checkered pattern are located at a stage prior to a CCD image sensor in a camera, a filtering process is performed on signal values, which have been obtained in the checkered pattern from the CCD image sensor, by use of a linear interpolation filter illustrated in FIG. 12 such that a mean value of the signal values arrayed in the vertical and horizontal directions may be calculated, and a signal value corresponding to each of the pixel positions indicated by the "X" mark in FIG. 3 is thereby calculated.

However, with the technique proposed in Japanese Unexamined Patent Publication No. 5(1993)-145857, the simple mean value of the signal values arrayed in the vertical and horizontal directions at each empty pixel position indicated by the "X" mark in FIG. 3 is calculated with the interpolation filter having approximately rhombic characteristics shown in FIG. 12, and the signal value corresponding to the empty pixel position is thereby calculated. Therefore, though the information of the checkered sampling image signal within the Nyquist frequency can be kept, the problems occur in that the image represented by the thus obtained image signal becomes unsharp. Accordingly, even if image processing is performed on the thus obtained image signal or a visible image is reproduced from the thus obtained image signal, an image having good image quality cannot always be obtained.

SUMMARY OF THE INVENTION

The primary object of the present invention is to provide an image acquiring method, wherein an image signal is acquired such that sharpness enhancement processing is capable of being performed on the image signal without noise being caused to occur.

Another object of the present invention is to provide an image processing method, wherein sharpness enhancement processing is performed on an image signal having been acquired with the image acquiring method.

A further object of the present invention is to provide an image transforming method, wherein an image having good image quality is capable of being obtained in cases where a checkered sampling image signal is transformed into a square sampling image signal.

A still further object of the present invention is to provide an image transforming method, wherein a checkered sampling image signal is capable of being transformed into a square sampling image signal, such that an image does not become unsharp and such that information carried by an original image is not lost.

Another object of the present invention is to provide an apparatus for carrying out the image acquiring method.

A further object of the present invention is to provide an apparatus for carrying out the image processing method.

A still further object of the present invention is to provide an apparatus for carrying out the image transforming method.

Another object of the present invention is to provide a recording medium, on which a program for causing a computer to execute the image acquiring method has been recorded and from which the computer is capable of reading the program.

A further object of the present invention is to provide a recording medium, on which a program for causing a computer to execute the image processing method has been recorded and from which the computer is capable of reading the program.

A still further object of the present invention is to provide a recording medium, on which a program for causing a computer to execute the image transforming method has been recorded and from which the computer is capable of reading the program.

The present invention provides an image acquiring method, comprising the step of picking up an image through sampling in a predetermined sampling pattern to acquire an image signal representing the image, wherein the improvement comprises the step of:
    appending sampling information, which concerns the predetermined sampling pattern, to the image signal, which has been acquired.

In order for the sampling information to be appended to the image signal, one of various techniques may be employed. Specifically, for example, the sampling information may be described at a file header of the image signal. Alternatively, besides a file of the image signal, an additional file may be formed on a recording medium for recording the image signal. The sampling information may be described in the additional file. As another alternative, when a plurality of image signals are recorded on a single recording medium, a file for describing information concerning an image signal may be formed, and the sampling information may be described in the file.

In the image acquiring method in accordance with the present invention, the sampling information should preferably be information for discriminating checkered sampling and square sampling from each other. In such cases, as the sampling information, for example, a symbol representing each of the checkered sampling and the square sampling, the symbol and the number of pixels at the time of the image pickup, or information representing frequency characteristics of each of the checkered sampling and the square sampling may be employed.

The present invention also provides an image processing method, comprising the step of performing sharpness enhancement processing on an image signal, which has been acquired with an image acquiring method in accordance with the present invention, wherein different sharpness enhancement processing is performed on the image signal and in accordance with the sampling information to obtain a processed image signal.

In the image processing method, the sharpness enhancement processing is varied in accordance with the sampling information. Specifically, for example, the direction, along which the processing is performed, may be varied on the image, which is represented by the image signal, in accordance with the sampling information as in the processing, wherein the sharpness enhancement processing with respect to the vertical direction of the image and the sharpness enhancement processing with respect to the horizontal direction the an image can be separated from each other in accordance with the sampling information. Alternatively, in cases where a filtering process is performed with a one-dimensional sharpness enhancement processing filter, the direction, along which the filtering process is performed, may be varied in accordance with the sampling information.

In the image processing method in accordance with the present invention, the different sharpness enhancement processing should preferably be a processing in accordance with frequency characteristics of the image signal, which has been acquired, due to the sampling pattern.

The present invention further provides an image acquiring apparatus, comprising means for picking up an image through sampling in a predetermined sampling pattern to acquire an image signal representing the image, wherein the improvement comprises the provision of:
sampling information appending means for appending sampling information, which concerns the predetermined sampling pattern, to the image signal, which has been acquired.

In the image acquiring apparatus in accordance with the present invention, the sampling information should preferably be information for discriminating checkered sampling and square sampling from each other.

The present invention still further provides an image processing apparatus, comprising processing means for performing sharpness enhancement processing on an image signal, which has been acquired with an image acquiring apparatus in accordance with the present invention, wherein the processing means performs different sharpness enhancement processing on the image signal and in accordance with the sampling information to obtain a processed image signal.

The image processing apparatus in accordance with the present invention should preferably be modified such that the processing means performs, as the different sharpness enhancement processing, a processing in accordance with frequency characteristics of the image signal, which has been acquired, due to the sampling pattern.

Also, the image signal in a format, in which the image signal is appended with the sampling information concerning the predetermined sampling pattern employed at the time of the image pickup through sampling in the predetermined sampling pattern, may be recorded on a recording medium, from which a computer is capable of reading the image signal, and may be furnished in this form.

The present invention also provides a recording medium, on which a program for causing a computer to execute the image acquiring method or the image processing method in accordance with the present invention has been recorded and from which the computer is capable of reading the program.

The image processing apparatus in accordance with the present invention may be provided in an image pickup device, such as a digital camera. Alternatively, the image processing apparatus in accordance with the present invention may be provided in an image output device, such as a printer.

The present invention further provides a first image transforming method, comprising the step of performing transforming processing on a square sampling image signal, which has been obtained from a checkered sampling image signal by performing a predetermined interpolating operation process on the checkered sampling image signal to form signal values corresponding to empty pixel positions in an array of pixels represented by image signal components of the checkered sampling image signal, wherein the transforming processing is a processing for performing an interpolating operation process, which is different from the predetermined interpolating operation process, on the square sampling image signal to form new signal values corresponding to the empty pixel positions, in lieu of the signal values having been formed with the predetermined interpolating operation process, and thereby to obtain a new square sampling image signal.

The term "predetermined interpolating operation process" as used herein means the interpolating operation process for calculating the signal values corresponding to the empty pixel positions with comparatively simple operations as described in, for example, Japanese Unexamined Patent Publication No. 5(1993)-145857.

The term "different interpolating operation process" as used herein means the interpolating operation process for calculating the signal values corresponding to the empty pixel positions such that image unsharpness may be suppressed. Specifically, the different interpolating operation process should preferably be an interpolating operation process, in which a filtering process is performed on signal values of the square sampling image signal other than the signal values having been formed with the predetermined interpolating operation process, the filtering process being performed with an interpolation filter having an array of filter factors obtained by rotating an array of filter factors in a N×M high order interpolation filter, where at least either one of N and M is at least 3, by an angle of 45 degrees. Alternatively, for example, the different interpolating operation process may be an interpolating operation process, in which a filtering process is performed with respect to the horizontal direction of the image to calculate the signal values corresponding to the empty pixel positions, thereafter the filtering process is performed with respect to the vertical direction of the image, and the signal values corresponding to all of the empty pixel positions are thereby calculated.

In the first image transforming method in accordance with the present invention, at least either one of N and M in the N×M high order interpolation filter is at least 3. This is because, if N=2 and M=2, the interpolation filter of a high order cannot be obtained, and a linear interpolation filter will be obtained. Also, N and M are positive integers.

In the first image transforming method in accordance with the present invention, the filter factors should preferably be filter factors of a 4×4 interpolation filter for performing a cubic spline interpolating operation process.

In the first image transforming method in accordance with the present invention, in cases where the original image signal is a square sampling image signal, i.e. an image signal acquired through the square sampling, no processing is performed.

The first image transforming method in accordance with the present invention should preferably be modified such that sampling information, which represents whether an image represented by an original image signal has been picked up through checkered sampling or square sampling, is appended to the square sampling image signal, and the processing for performing the different interpolating operation process to obtain the new square sampling image signal is performed only in cases where it has been discriminated in accordance with the sampling information that the image has been picked up through the checkered sampling.

In order for the sampling information to be appended to the square sampling image signal, one of various techniques may be employed. Specifically, for example, the sampling information may be described at a file header of the image signal. Alternatively, besides a file of the image signal, an additional file may be formed on a recording medium for recording the image signal. The sampling information may be described in the additional file. As another alternative, when a plurality of image signals are recorded on a single recording medium, a file for describing information concerning an image signal may be formed, and the sampling information may be described in the file.

In the first image transforming method in accordance with the present invention, the sampling information should preferably be information for discriminating checkered sampling and square sampling from each other. In such cases, as the sampling information, for example, a symbol representing each of the checkered sampling and the square sampling, the symbol and the number of pixels at the time of the image pickup, or information representing frequency characteristics of each of the checkered sampling and the square sampling may be employed.

The present invention still further provides a first image transforming apparatus, comprising transforming processing means for performing transforming processing on a square sampling image signal, which has been obtained from a checkered sampling image signal by performing a predetermined interpolating operation process on the checkered sampling image signal to form signal values corresponding to empty pixel positions in an array of pixels represented by image signal components of the checkered sampling image signal, wherein the transforming processing means performs the transforming processing for performing an interpolating operation process, which is different from the predetermined interpolating operation process, on the square sampling image signal to form new signal values corresponding to the empty pixel positions, in lieu of the signal values having been formed with the predetermined interpolating operation process, and thereby to obtain a new square sampling image signal.

In the first image transforming apparatus in accordance with the present invention, the different interpolating operation process performed by the transforming processing means should preferably be an interpolating operation process, in which a filtering process is performed on signal values of the square sampling image signal other than the signal values having been formed with the predetermined interpolating operation process, the filtering process being performed with an interpolation filter having an array of filter factors obtained by rotating an array of filter factors in a N×M high order interpolation filter, where at least either one of N and M is at least 3, by an angle of 45 degrees.

In such cases, the filter factors should preferably be filter factors of a 4×4 interpolation filter for performing a cubic spline interpolating operation process.

The first image transforming apparatus in accordance with the present invention should preferably be modified such that sampling information, which represents whether an image represented by an original image signal has been picked up through checkered sampling or square sampling, is appended to the square sampling image signal, the apparatus further comprises discrimination means for discriminating in accordance with the sampling information whether the image has been picked up through the checkered sampling or not, and the transforming processing means performs the processing for performing the different interpolating operation process to obtain the new square sampling image signal only in cases where it has been discriminated by the discrimination means that the image has been picked up through the checkered sampling.

The present invention also provides a recording medium, on which a program for causing a computer to execute the first image transforming method in accordance with the present invention has been recorded and from which the computer is capable of reading the program.

The first image transforming apparatus in accordance with the present invention may be provided in an image pickup device, such as a digital camera. Alternatively, the first image transforming apparatus in accordance with the present invention may be provided in an image output device, such as a printer.

The present invention further provides a second image transforming method, comprising the step of transforming a checkered sampling image signal into a square sampling image signal, wherein the checkered sampling image signal is transformed into the square sampling image signal by performing a filtering process on the checkered sampling image signal and with an interpolation filter, which has an array of filter factors obtained by rotating an array of filter factors in a N×M high order interpolation filter, where at least either one of N and M is at least 3, by an angle of 45 degrees.

In the second image transforming method in accordance with the present invention, at least either one of N and M in the N×M high order interpolation filter is at least 3. This is because, if N=2 and M=2, the interpolation filter of a high order cannot be obtained, and a linear interpolation filter will be obtained. Also, N and M are positive integers.

In the second image transforming method in accordance with the present invention, the filter factors should preferably be filter factors of a 4×4 interpolation filter for performing a cubic spline interpolating operation process.

The present invention still further provides a second image transforming apparatus, comprising transforming means for transforming a checkered sampling image signal into a square sampling image signal, wherein the transforming means transforms the checkered sampling image signal into the square sampling image signal by performing a filtering process on the checkered sampling image signal and with an interpolation filter, which has an array of filter factors obtained by rotating an array of filter factors in a N×M high order interpolation filter, where at least either one of N and M is at least 3, by an angle of 45 degrees.

In the second image transforming apparatus in accordance with the present invention, the filter factors should preferably be filter factors of a 4×4 interpolation filter for performing a cubic spline interpolating operation process.

The present invention also provides a recording medium, on which a program for causing a computer to execute the second image transforming method in accordance with the present invention has been recorded and from which the computer is capable of reading the program.

The second image transforming apparatus in accordance with the present invention may be provided in an image pickup device, such as a digital camera. Alternatively, the second image transforming apparatus in accordance with the present invention may be provided in an image output device, such as a printer.

With the image acquiring method and apparatus in accordance with the present invention, the sampling information, which concerns the sampling pattern employed at the time of image pickup, is appended to the image signal, which has been acquired. Therefore, reference may be made to the sampling information, and image processing, such as sharpness enhancement processing, appropriate in accordance with the sampling pattern employed at the time of image pickup can be performed on the image signal, which has been acquired with the image acquiring method and apparatus in accordance with the present invention.

With the image processing method and apparatus in accordance with the present invention, the different sharpness enhancement processing is performed on the image signal, which has been acquired with the image acquiring method and apparatus in accordance with the present invention, and in accordance with the sampling information, which concerns the predetermined sampling pattern employed at the time of image pickup. Therefore, the sharpness enhancement processing can be performed such that no noise may occur regardless of the sampling pattern. Accordingly, the processed image signal, from which an image having good image quality free from noise can be reproduced, can be obtained.

With the first image transforming method and apparatus in accordance with the present invention, the interpolating operation process, which is different from the predetermined interpolating operation process, is performed on the square sampling image signal to form the new signal values corresponding to the empty pixel positions, in lieu of the signal values having been formed with the predetermined interpolating operation process, and thereby to obtain the new square sampling image signal. The thus obtained new square sampling image signal represents an image, which has sharpness higher than the sharpness of the image represented by the square sampling image signal having been formed with the predetermined interpolating operation process. Therefore, in cases where an image is reproduced from the new square sampling image signal or image processing is performed on the new square sampling image signal, an image having good image quality with high sharpness can be obtained.

In cases where the interpolating operation process is performed on the square sampling image signal, the N×M high order interpolation filter should preferably be utilized. In such cases, the interpolating operation can be performed such that the image may not become unsharp and the original image reproducible range may not be affected adversely. Also, the signal values of the square sampling image signal other than the signal values having been formed with the predetermined interpolating operation process are the signal values of the checkered sampling image signal before being subjected to the predetermined interpolating operation process. The checkered sampling image signal has the frequency characteristics inclined in the direction rotated by an angle of 45 degrees with respect to the frequency characteristics of the square sampling image signal. Therefore, in cases where the interpolating operation process with the interpolation filter, which has the array of the filter factors obtained by rotating the array of the filter factors in the N×M high order interpolation filter by an angle of 45 degrees, is employed as the different interpolating operation process, the interpolating operation process can be performed with respect to the signal values of the checkered sampling image signal such that the image may not become unsharp and the original image reproducible range may not be affected adversely. In this manner, the new square sampling image signal can be obtained.

Further, with the first image transforming method and apparatus in accordance with the present invention, wherein the sampling information, which concerns the sampling pattern employed at the time of image pickup, is appended to the square sampling image signal, reference may be made to the sampling information, and it can be found immediately whether the square sampling image signal is the one which was originally acquired through the checkered sampling or is the one which was originally acquired through the square sampling. Therefore, a judgment can be made easily as to whether the interpolating operation process for obtaining the new square sampling image signal should be or should not be performed.

As described above, in cases where the interpolating operation process is performed on the square sampling image signal, the N×M high order interpolation filter should preferably be utilized. In such cases, the interpolating operation can be performed such that the image may not become unsharp and the original image reproducible range may not be affected adversely. The checkered sampling image signal has the frequency characteristics inclined in the direction rotated by an angle of 45 degrees with respect to the frequency characteristics of the square sampling image signal. With the second image transforming method and apparatus in accordance with the present invention, the interpolating operation process is performed on the checkered sampling image signal and with the interpolation filter, which has the array of the filter factors obtained by rotating the array of the filter factors in the N×M high order interpolation filter by an angle of 45 degrees. Therefore, the interpolating operation process can be performed on the checkered sampling image signal such that the image may not become unsharp and the original image reproducible range may not be affected adversely. In this manner, the square sampling image signal can be obtained.

BRIEF DESCRIPTION OF THE DRAWINGS

FIG. 3 is an explanatory view showing a pixel array of pixels represented by image signal components of a checkered sampling image signal, i.e. an image signal acquired through checkered sampling, FIG. 16 is an explanatory view showing a different example of an interpolation filter, FIG. 17 is an explanatory view showing a further different example of an interpolation filter.

DESCRIPTION OF THE PREFERRED EMBODIMENTS

The present invention will hereinbelow be described in further detail with reference to the accompanying drawings.

Figure 1:
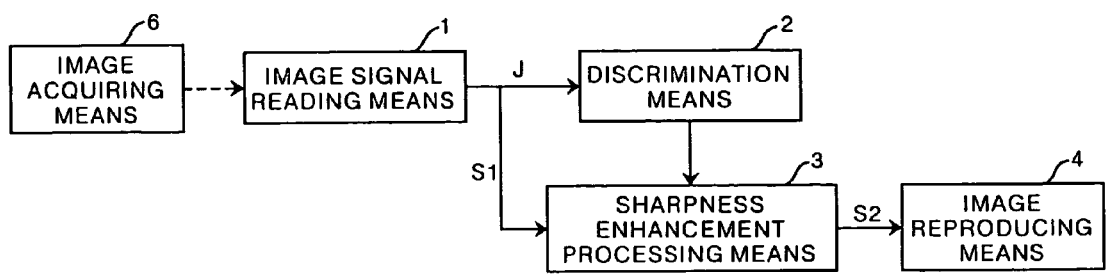
FIG. 1 is a block diagram showing an image output system, in which a first embodiment of the image processing apparatus in accordance with the present invention is employed.

FIG. 1 is a block diagram showing an image output system, in which a first embodiment of the image processing apparatus in accordance with the present invention is employed. With reference to FIG. 1, in the image output system, in which the first embodiment of the image processing apparatus in accordance with the present invention is employed, processing is performed on an image signal S1 fed out from image acquiring means 6, which picks up an image through sampling in a predetermined sampling pattern to acquire the image signal S1 representing the image, and which appends sampling information J concerning the sampling pattern to the image signal S1 and feeds out the image signal S1 appended with the sampling information J. The image output system comprises image signal reading means 1 for reading the image signal S1 from the image acquiring means 6. The image output system also comprises discrimination means 2 for discriminating, in accordance with the sampling information J appended to the image signal S1, whether the sampling pattern employed at the time of image pickup in the image acquiring means 6 is a checkered sampling pattern or a square sampling pattern. The image output system further comprises sharpness enhancement processing means 3 for performing different sharpness enhancement processing on the image signal S1 and in accordance with the results of the discrimination made by the discrimination means 2, and thereby obtaining a processed image signal S2. The image output system still further comprises image reproducing means 4 for reproducing a visible image from the processed image signal S2.

Figure 2:
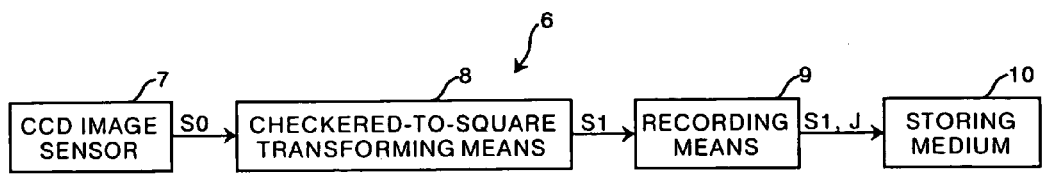
FIG. 2 is a block diagram showing image acquiring means in the first embodiment of FIG. 1.

FIG. 2 is a block diagram showing an example of the image acquiring means 6. With reference to FIG. 2, by way of example, the image acquiring means 6 is constituted of a digital camera. The image acquiring means 6 comprises a CCD image sensor 7 for picking up the image of a scene through sampling in a checkered sampling pattern to obtain an image signal S0 representing the image. The image acquiring means 6 also comprises checkered-to-square transforming means 8 for performing an interpolating operation process on the image signal (in this case, the checkered sampling image signal, i.e. the image signal acquired through the checkered sampling) S0 to transform the sampling pattern of the image signal S0 from the checkered sampling pattern to a square sampling pattern and thereby to obtain the image signal (i.e., the square sampling image signal acquired through sampling in the square sampling pattern) S1. The image acquiring means 6 further comprises recording means 9 for appending the information, which concerns the sampling pattern employed at the time of the image pickup, as the sampling information J to the image signal S1, and recording the image signal S1, which has been appended with the sampling information J, on a storing medium 10, such as a memory card. In cases where the CCD image sensor 7 is the one designed to pick up the image through sampling in the square sampling pattern, the image acquiring means 6 is not provided with the checkered-to-square transforming means 8, and the image signal (in this case, the square sampling image signal) S0 having been acquired with the CCD image sensor 7 is recorded as the image signal S1 together with the sampling information J on the storing medium 10.

In cases where the image acquiring means 6 is constituted of a scanner for photoelectrically reading out the image, in order for the image to be picked up through the sampling in the checkered sampling pattern, the sample holding positions may be shifted by a length corresponding to one half of a pixel with respect to each scanning line, and the image signal S0 may thereby be acquired as the checkered sampling image signal. In such cases, the scanner is provided with the checkered-to-square transforming means 8 shown in FIG. 2, and the sampling pattern of the image signal S0 is transformed by the checkered-to-square transforming means 8 from the checkered sampling pattern to the square sampling pattern. In this manner, the square sampling image signal S1 is obtained.

Figure 3:
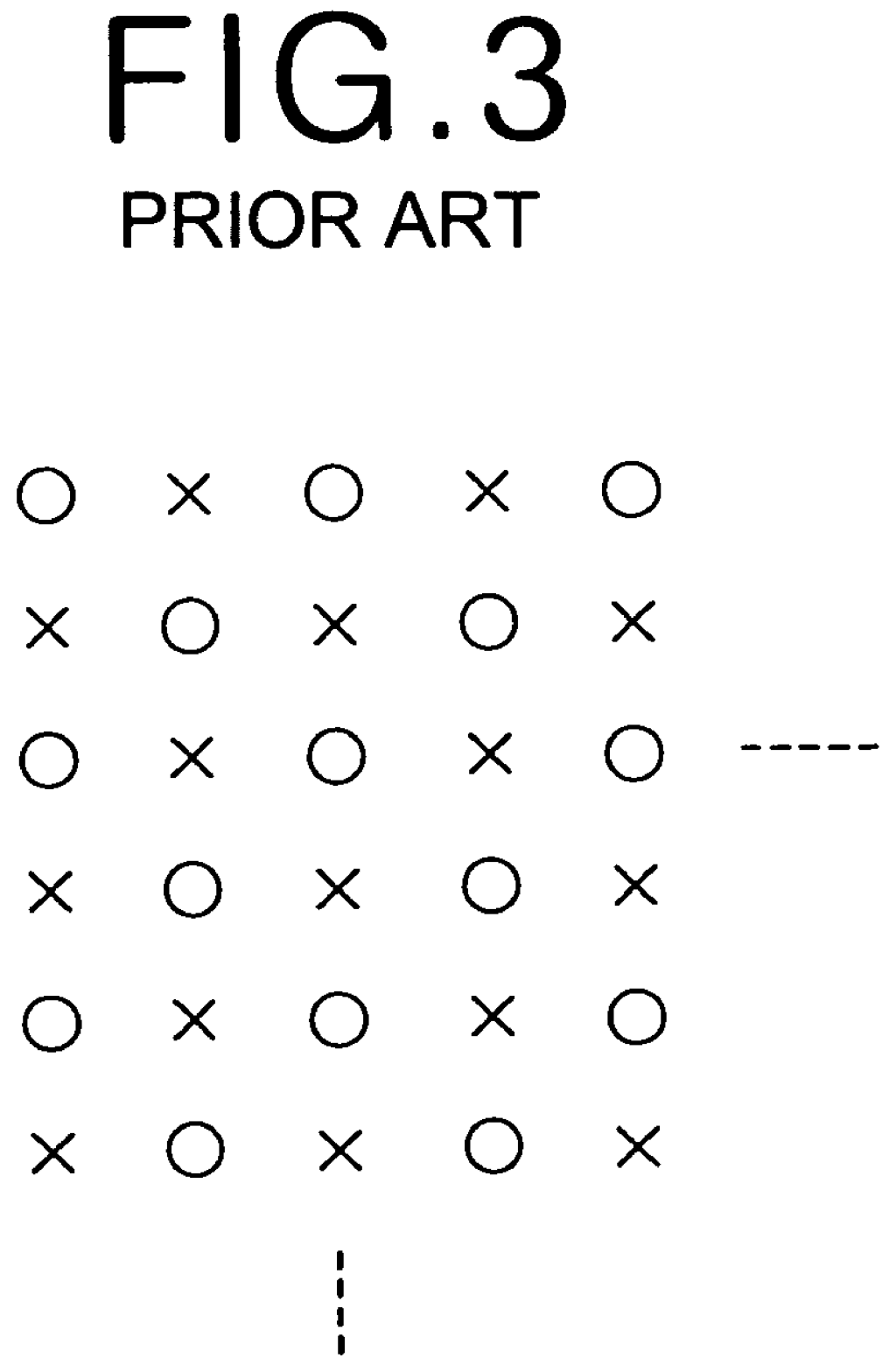

As illustrated in FIG. 3, in cases where the image signal S0 is the one having been acquired through the sampling in the checkered sampling pattern, the pixel positions in the pixel array shown in FIG. 3, which are indicated by the "O" mark, have signal values, and the pixel positions indicated by the "X" mark (hereinbelow referred to also as the empty pixel positions) have no signal value. Therefore, in the checkered-to-square transforming means 8, the interpolating operation process is performed by utilizing the signal values corresponding to the pixel positions indicated by the "O" mark, and the signal values corresponding to the pixel positions indicated by the "X" mark are thereby calculated.

Figure 4:
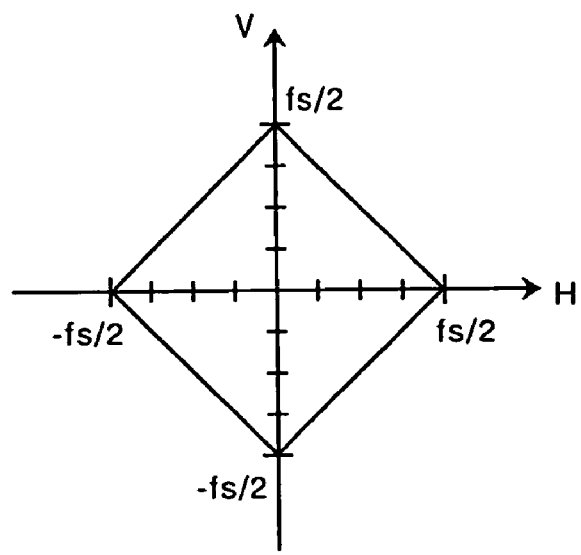
FIG. 4 is a graph showing frequency characteristics of a checkered sampling image signal.

In cases where the image signal S0 is the one having been acquired through the sampling in the checkered sampling pattern and the frequency characteristics of the checkered sampling image signal S0 are represented in two-dimensional directions, the frequency characteristics may be represented as a rhombic response illustrated in FIG. 4. In FIG. 4, the frequency bands, which the checkered sampling image signal S0 can express, are indicated by the solid lines. In cases where the image signal S0 is transformed into the square sampling image signal, the frequency bands expressing the original image are not altered, and therefore the frequency characteristics shown in FIG. 4 are not altered.

The recording means 9 appends the sampling information J to the image signal S1 and records the image signal S1, which has been appended with the sampling information J, on the storing medium 10. In order for the sampling information J to be appended to the image signal S1, one of various techniques may be employed. Specifically, for example, the sampling information J may be described at a file header of the image signal S1. Alternatively, the image signal S1 and the sampling information J may be described in different files on the storing medium 10. As another alternative, when a plurality of image signals S1, S1, . . . are recorded on the storing medium 10, a file for describing information concerning the image signal S1 may be formed, and the sampling information J may be described in the file.

As the sampling information J, for example, a symbol representing each of the checkered sampling and the square sampling, a combination of the symbol, which represents each of the checkered sampling and the square sampling, and the number of pixels at the time of the image pickup, or information representing the frequency characteristics of the image signal S0 may be employed. If the number of pixels at the time of the image pickup is found, the Nyquist frequency of the image represented by the image signal S0 can be calculated. Also, if the sampling pattern of the image signal S0 is found, the frequency characteristics shown in, for example, FIG. 4 can be calculated in accordance with the Nyquist frequency. As the information representing the frequency characteristics of the image signal S0, for example, in the cases of the frequency characteristics shown in FIG. 4, the information representing the coordinates of four vertexes of the frequency characteristics may be employed. If the coordinates of the four vertexes of the frequency characteristics are found, the frequency characteristics as illustrated in FIG. 4 can be calculated.

The sampling information J is not limited to the information described above. For example, in cases where the image signal S0 is the one having been acquired through the square sampling, no information may be appended to the image signal S0. Also, in cases where the sampling pattern can be specified in accordance with the kind of the image acquiring means 6, the information representing the kind of the image acquiring means 6 may be employed as the sampling information J.

Reverting to FIG. 1, the discrimination means 2 discriminates the sampling pattern, which was employed at the time of the image pickup, in accordance with the sampling information J. In cases where the sampling information J is the symbol representing each of the checkered sampling and the square sampling, the discrimination means 2 discriminates the symbol. In cases where the sampling information J contains the number of pixels at the time of the image pickup in addition to the symbol, which represents each of the checkered sampling and the square sampling, the discrimination means 2 discriminates the symbol and the frequency characteristics of the image signal S0. In cases where the sampling information J is the information representing the frequency characteristics of the image signal S0, the discrimination means 2 discriminates the sampling pattern in accordance with the shape of the response represented by the frequency characteristics of the image signal S0.

Figure 5:
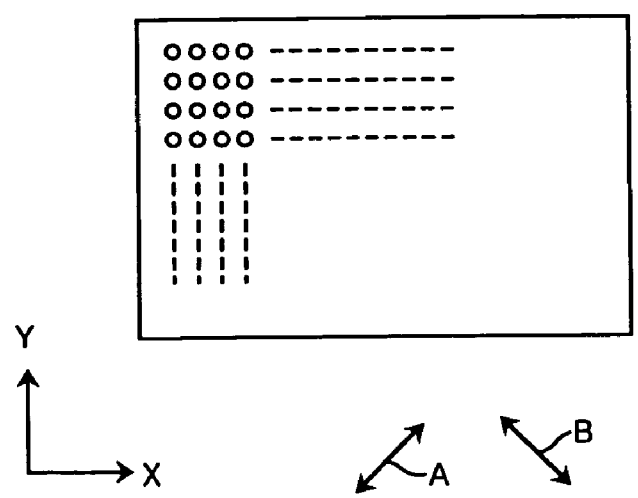
FIG. 5 is an explanatory view showing a pixel array of pixels represented by image signal components of a square sampling image signal, i.e. an image signal acquired through square sampling.
Figure 6:
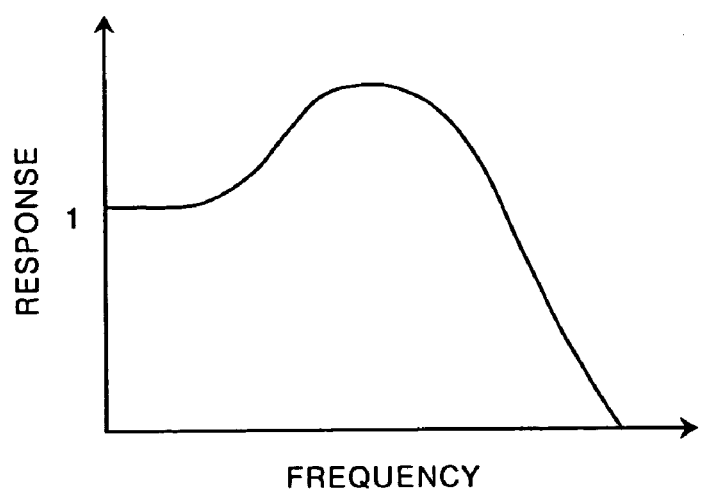
FIG. 6 is a graph showing frequency characteristics of a one-dimensional filter employed in sharpness enhancement processing.

The sharpness enhancement processing means 3 performs different sharpness enhancement processing on the image signal S1 and in accordance with the results of the discrimination made by the discrimination means 2, and thereby obtains the processed image signal S2. Specifically, in cases where it has been discriminated that the sampling pattern employed at the time of the image pickup is the square sampling pattern, the sharpness enhancement processing means 3 performs ordinary sharpness enhancement processing (hereinbelow referred to as the first sharpness enhancement processing). The first sharpness enhancement processing is the processing, wherein the processing with respect to the X direction in an array of pixels in the image represented by the image signal S1, which array is illustrated in FIG. 5, and the processing with respect to the Y direction in the array of the pixels can be separated from each other. More specifically, in the first sharpness enhancement processing, the sharpness enhancement processing with Formula (1) shown below may firstly be performed with respect to the X direction of the pixel array, and thereafter the sharpness enhancement processing with Formula (1) shown below may be performed with respect to the Y direction of the pixel array. Also, in the first sharpness enhancement processing, in order for an unsharp masking image signal Sus to be calculated, a M×M rectangular mask may be utilized. Alternatively, in the first sharpness enhancement processing, a filtering process with a one-dimensional filter, which has the frequency characteristics illustrated in FIG. 6, may be performed successively with respect to the X direction and the Y direction of the array of the pixels in the image represented by the image signal S1, and the sharpness may thereby be enhanced.

$$S2 = S1 + \beta(S1 - Sus) \tag{1}$$

in which β represents the enhancement coefficient, and Sus represents the unsharp masking image signal of the image signal S1 and may be represented by the formula Sus=ΣS1/M×M, where M represents the mask size.

In cases where the frequency characteristics of the image signal S1 can be recognized from the sampling information J, the mask size or the response of the one-dimensional filter can be altered in accordance with the frequency characteristics of the image signal S1. In this manner, the sharpness enhancement processing can be performed in accordance with the frequency characteristics of the image signal S1.

Figure 7A:
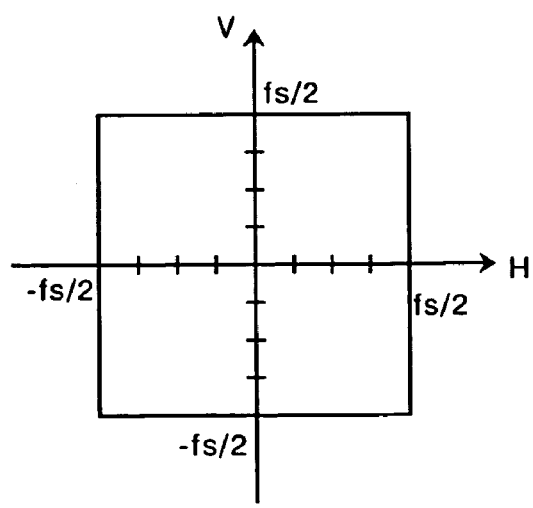
FIG. 7A is a graph showing frequency characteristics of a square sampling image signal.
Figure 7B:
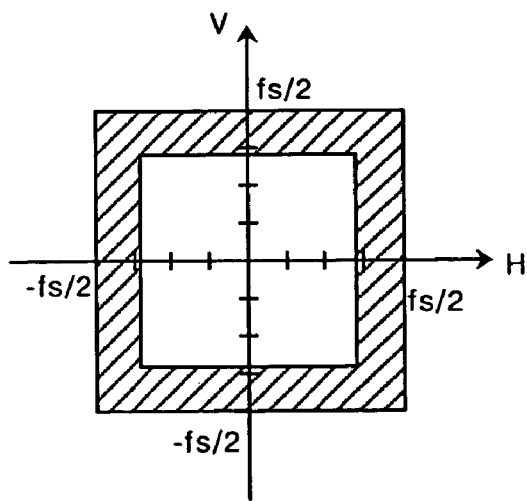
FIG. 7B is a graph showing frequency ranges enhanced with first sharpness enhancement processing.

FIG. 7A shows the frequency characteristics of the square sampling image signal. FIG. 7B shows frequency ranges enhanced with the first sharpness enhancement processing. As illustrated in FIG. 7A, the frequency characteristics of the square sampling image signal may be represented as a rectangular response. With the first sharpness enhancement processing, the frequency bands indicated by the hatching in FIG. 7B are enhanced. The sharpness of the image signal S1 is thus enhanced, and the processed image signal S2 is obtained.

Figure 8:
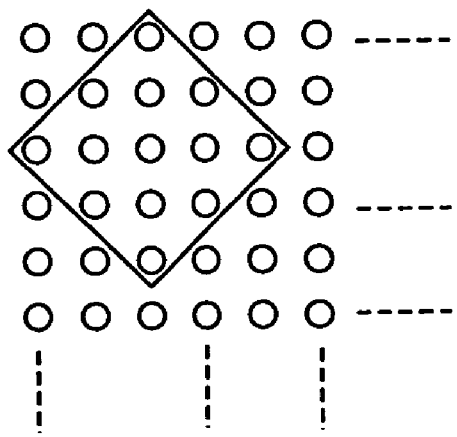
FIG. 8 is an explanatory view showing how an unsharp masking image signal is calculated in second sharpness enhancement processing.

In cases where it has been discriminated that the sampling pattern employed at the time of the image pickup is the checkered sampling pattern, the sharpness enhancement processing means 3 performs second sharpness enhancement processing. The second sharpness enhancement processing is the processing, wherein the processing with respect to one of the diagonal directions in the array of the pixels in the image represented by the image signal S1, which array is illustrated in FIG. 5, and the processing with respect to the other diagonal direction in the array of the pixels can be separated from each other. Specifically, in the second sharpness enhancement processing, the sharpness enhancement processing with Formula (1) shown above may firstly be performed with respect to the X=Y direction of the pixel array (i.e., the direction indicated by the double headed arrow A in FIG. 5), and thereafter the sharpness enhancement processing with Formula (1) shown above may be performed with respect to the X=−Y direction of the pixel array (i.e., the direction indicated by the double headed arrow B in FIG. 5). Also, in the second sharpness enhancement processing, in order for an unsharp masking image signal Sus to be calculated, a rhombic mask as illustrated in FIG. 8 may be utilized. Alternatively, in the second sharpness enhancement processing, the filtering process with the one-dimensional filter, which has the frequency characteristics illustrated in FIG. 6, may be performed successively with respect to the direction indicated by the double headed arrow A in FIG. 5 and the direction indicated by the double headed arrow B in FIG. 5, and the sharpness may thereby be enhanced.

Figure 9:
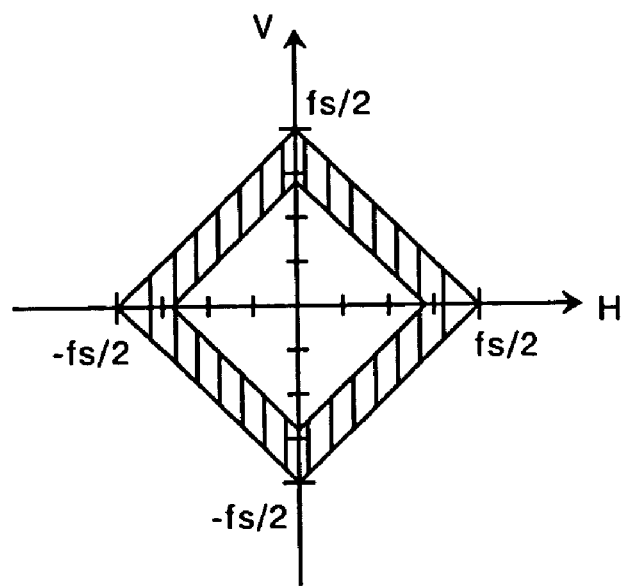
FIG. 9 is a graph showing frequency ranges enhanced with the second sharpness enhancement processing.

The checkered sampling image signal has the frequency characteristics illustrated in FIG. 4. With the second sharpness enhancement processing, the frequency bands indicated by the hatching in FIG. 9 are enhanced. The sharpness of the image signal S1 is thus enhanced, and the processed image signal S2 is obtained.

When FIGS. 7A, 7B and FIG. 9 are compared with each other, in the checkered sampling image signal, the information at the four corner regions in the characteristics of the square sampling image signal is lost. Therefore, if the sharpness enhancement processing is performed on the checkered sampling image signal in the same manner as that for the square sampling image signal, the information at the lost regions will be enhanced, and the enhanced information will appear as noise in the image represented by the processed image signal S2. However, with this embodiment of the image processing apparatus in accordance with the present invention, wherein the second sharpness enhancement processing is performed in cases where it has been discriminated that the sampling pattern employed at the time of the image pickup is the checkered sampling pattern, the sharpness enhancement processing in accordance with the characteristics of the frequency bands of the checkered sampling image signal can be performed. Therefore, noise can be prevented from occurring in the image reproduced from the processed image signal S2.

The image reproducing means 4 is the means capable of reproducing a visible image from the processed image signal S2. By way of example, the image reproducing means 4 may be constituted of a hard copy device, such as a digital silver halide photographic printer or an ink jet printer, or a soft copy device, such as a CRT display device or a liquid crystal display device.

Figure 10:
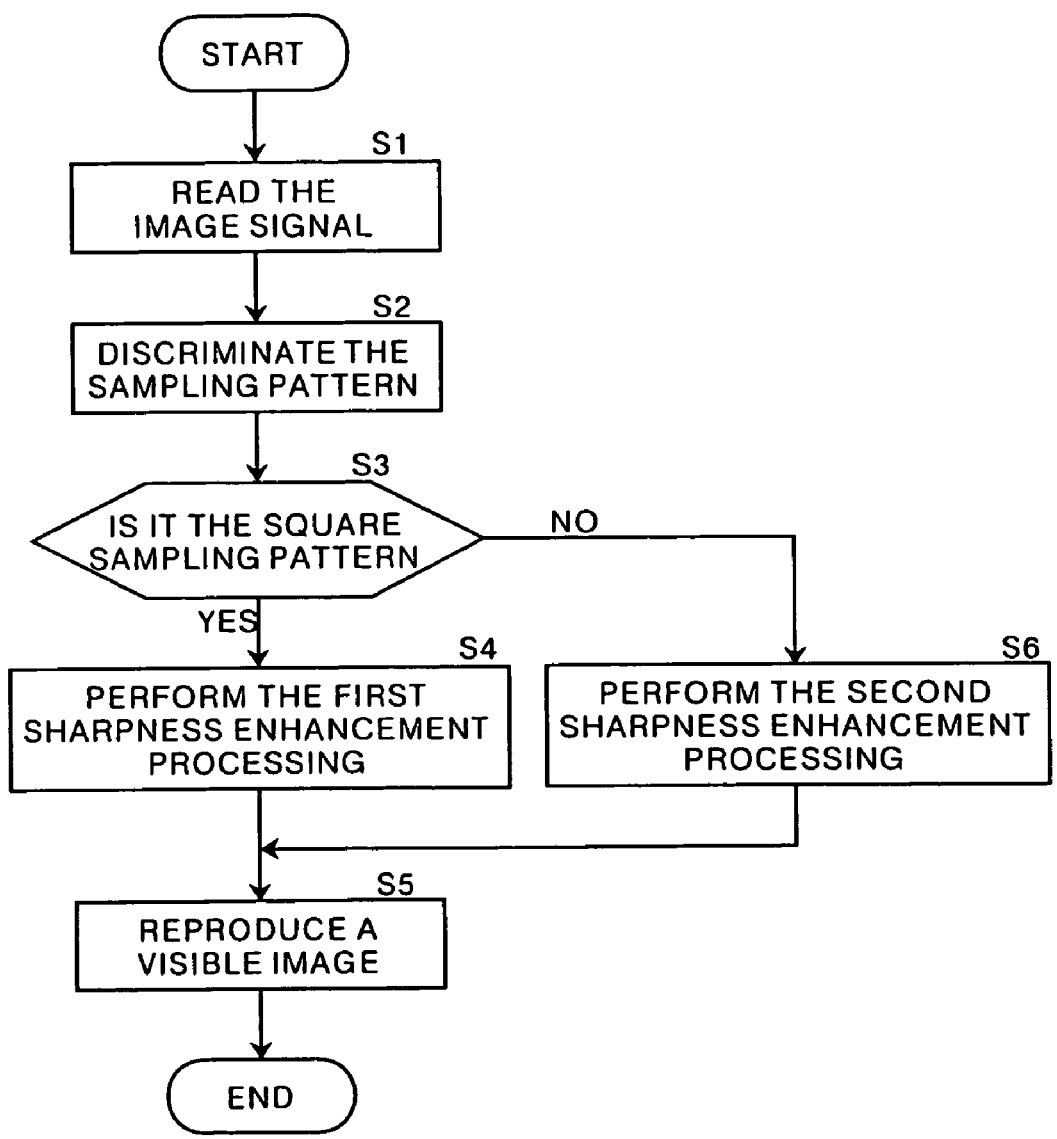
FIG. 10 is a flow chart showing how the first embodiment of FIG. 1 operates.

How the first embodiment of the image processing apparatus in accordance with the present invention operates will be described hereinbelow. FIG. 10 is a flow chart showing how the first embodiment of FIG. 1 operates. As illustrated in FIG. 10, in a step S1, the image signal S1, which has been acquired with the image acquiring means 6, and the sampling information J appended to the image signal S1 are read by the image signal reading means 1. The image signal S1 is fed into the sharpness enhancement processing means 3, and the sampling information J is fed into the discrimination means 2. In a step S2, the discrimination means 2 discriminates in accordance with the sampling information J whether the sampling pattern employed at the time of the acquisition of the image signal S0 is the checkered sampling pattern or the square sampling pattern. In cases where it has been discriminated in the step S2 that the sampling pattern employed at the time of the acquisition of the image signal S0 is the square sampling pattern, the question in a step S3 is affirmed. In such cases, in a step S4, the first sharpness enhancement processing is performed on the image signal S1 by the sharpness enhancement processing means 3, and the processed image signal S2 is obtained. Finally, in a step S5, a visible image is reproduced from the processed image signal S2 by the image reproducing means 4.

In cases where it has been discriminated in the step S2 that the sampling pattern employed at the time of the acquisition of the image signal S0 is the checkered sampling pattern, the question in the step S3 is denied. In such cases, in a step S6, the second sharpness enhancement processing is performed on the image signal S1 by the sharpness enhancement processing means 3, and the processed image signal S2 is obtained. Finally, in the step S5, a visible image is reproduced from the processed image signal S2 by the image reproducing means 4.

As described above, in the first embodiment of the image processing apparatus in accordance with the present invention, different sharpness enhancement processing is performed on the image signal S1 and in accordance with the sampling information J, which concerns the sampling pattern employed at the time of image pickup. Therefore, in both of the cases where the image signal S0 is the one having been acquired through the sampling in the checkered sampling pattern and the cases where the image signal S0 is the one having been acquired through the sampling in the square sampling pattern, the sharpness enhancement processing can be performed on the image signal S1 such that no noise may occur. Accordingly, the processed image signal S2, from which an image having good image quality free from noise can be reproduced, can be obtained.

In the first embodiment of the image processing apparatus in accordance with the present invention, in cases where the image signal S0 is the checkered sampling image signal, the image signal S0 is transformed into the square sampling image signal S1 in the image acquiring means 6. Alternatively, instead of the image signal S0 being transformed into the square sampling image signal S1 in the image acquiring means 6, the image signal S0 in the form of the checkered sampling image signal may be recorded on the storing medium 10. In such cases, in the image processing apparatus, interpolating operation means for transforming the checkered sampling image signal into the square sampling image signal may be located at the stage prior to the sharpness enhancement processing means 3, and the square sampling image signal S1 may be obtained from the interpolating operation means. Also, in such cases, discrimination may be made in the discrimination means 2 as to whether the checkered sampling image signal has been transformed into the square sampling image signal or not in the interpolating operation means. In this manner, it may be discriminated whether the sampling pattern employed at the time of the image pickup is the checkered sampling pattern or the square sampling pattern. In accordance with the results of the discrimination, the sharpness enhancement processing performed by the sharpness enhancement processing means 3 may be changed over.

Further, in the first embodiment of the image processing apparatus in accordance with the present invention, the image signal S1, which has been acquired with the image acquiring means 6, is recorded together with the sampling information J on the storing medium 10, and the image signal S1 and the sampling information J are read by the image signal reading means 1 from the storing medium 10. Alternatively, the image signal S1 may be transferred together with the sampling information J through a network to the image signal reading means 1. In such cases, in lieu of the recording means 9 of the image acquiring means 6, an interface for connecting the image acquiring means 6 and the image signal reading means 1 to each other is utilized.

A second embodiment of the image processing apparatus in accordance with the present invention, wherein processing is performed on an image signal in accordance with sampling information having been obtained in the image acquiring apparatus in accordance with the present invention, will be described hereinbelow.

Figures 11, 12:
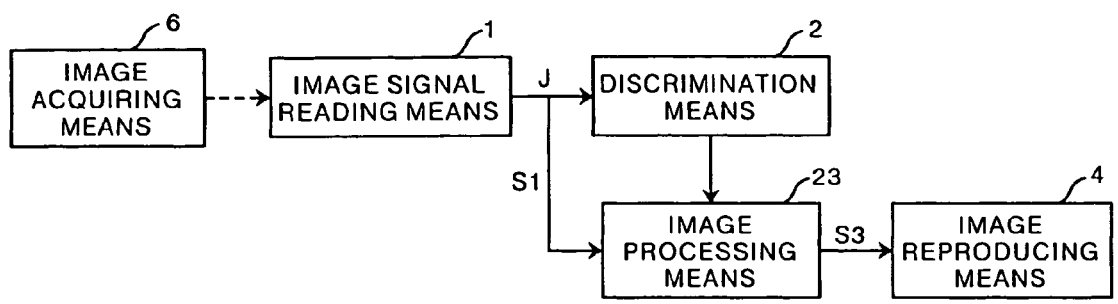
FIG. 11 is a block diagram showing an image output system, in which a second embodiment of the image processing apparatus in accordance with the present invention is employed.
FIG. 12 is an explanatory view showing a linear interpolation filter.

FIG. 11 is a block diagram showing an image output system, in which a second embodiment of the image processing apparatus in accordance with the present invention is employed. With reference to FIG. 11, in the image output system, processing is performed on the image signal S1 having been received from the image acquiring means 6. As in the embodiment of FIG. 1, the image output system comprises the image signal reading means 1, the discrimination means 2, and the image reproducing means 4. The image output system also comprises image processing means 23 for performing image processing, which contains transforming processing described later, on the image signal S1 and in accordance with the results of the discrimination made by the discrimination means 2, and thereby obtaining a processed image signal S3. In the second embodiment, in the checkered-to-square transforming means 8 of the image acquiring means 6, as described in Japanese Unexamined Patent Publication No. 5(1993)-145857, an interpolating operation process is performed with the linear interpolation filter shown in FIG. 12 by utilizing the signal values corresponding to the pixel positions indicated by the "O" in FIG. 3, and the signal value corresponding to each pixel position indicated by the "X" mark in FIG. 3 is thereby calculated. In this manner, the square sampling image signal S1 is obtained from the checkered-to-square transforming means 8.

Figures 13, 14:
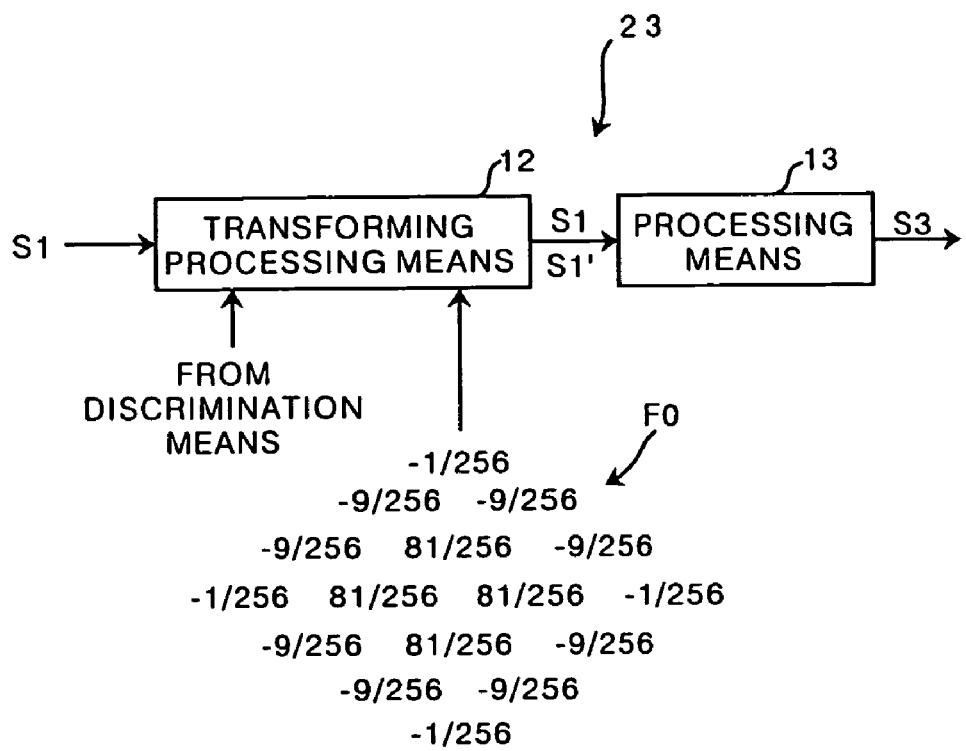
FIG. 13 is a block diagram showing image processing means in the second embodiment of FIG. 11.
FIG. 14 is an explanatory view showing an interpolation filter employed in a two-dimensional cubic spline interpolating operation process.

The image processing means 23 performs the image processing on the image signal S1 in the manner described below in accordance with the results of the discrimination made by the discrimination means 2 and obtains the processed image signal S3. FIG. 13 is a block diagram showing the image processing means 23 in the second embodiment of FIG. 11. As illustrated in FIG. 13, the image processing means 23 comprises transforming processing means 12 and processing means 13. In cases where it has been discriminated that the sampling pattern employed when the image was picked up by the image acquiring means 6 is the checkered sampling pattern, the transforming processing means 12 performs an interpolating operation process with an interpolation filter F0, which will be described later, on the image signal S1 by utilizing only the signal values corresponding to the pixel positions in the image represented by the image signal S1, which pixel positions are indicated by the "O" mark in FIG. 3. In this manner, the transforming processing means 12 obtains a new square sampling image signal S1'. The processing means 13 performs image processing, such as gradation processing or sharpness enhancement processing, on the new square sampling image signal S1' and thereby obtains the processed image signal S3. In cases where it has been discriminated that the sampling pattern employed when the image was picked up by the image acquiring means 6 is the square sampling pattern, the transforming processing means 12 does not perform any processing and directly feeds out the image signal S1.

In the transforming processing means 12, the interpolating operation process is performed on the image signal S1 in the manner described below. As illustrated in FIG. 3, in cases where the image signal S0 is the one having been acquired through the sampling in the checkered sampling pattern, the pixel positions in the pixel array shown in FIG. 3, which are indicated by the "O" mark, have signal values, and the pixel positions indicated by the "X" mark have no signal value. The square sampling image signal S1 has signal values also at the pixel positions indicated by the "X" mark. However, the signal values of the image signal S1, which correspond to the pixel positions indicated by the "X" mark, are the ones which have been calculated with the interpolating operation process performed with the linear interpolation filter having the characteristics shown in FIG. 12. Therefore, the image represented by the image signal S1 is unsharp. Accordingly, the transforming processing means 12 performs a filtering process with the interpolation filter F0, which has the factors illustrated in FIG. 13, on the image signal S1 by utilizing only the signal values corresponding to the pixel positions in the image represented by the image signal S1 having been acquired with the image acquiring means 6, which pixel positions are indicated by the "O" mark in FIG. 3. In this manner, the transforming processing means 12 calculates new signal values corresponding to the pixel positions indicated by the "X" mark. Also, the transforming processing means 12 replaces the signal values of the image signal S1, which signal values correspond to the pixel positions indicated by the "X" mark, by the thus calculated new signal values corresponding to the pixel positions indicated by the "X" mark. In this manner, the transforming processing means 12 obtains the new square sampling image signal S1'. The filtering process is the convolutional operation performed on the filter factors of the interpolation filter F0 and the signal values corresponding to the pixel positions indicated by the "O" mark.

The interpolation filter F0 is formed in the manner described below. Specifically, interpolation factors of the one-dimensional cubic spline interpolating operation process for calculating a signal value corresponding to the middle point of four pixels are $-1/16$, $9/16$, $9/16$, and $-1/16$. Therefore, as illustrated in FIG. 14, when the interpolation factors are developed in two-dimensional directions, an interpolation filter constituted of a 4×4 factor matrix is obtained. The array of the filter factors of the interpolation filter is rotated by an angle of 45 degrees, and the interpolation filter F0 having the array of the filter factors illustrated in FIG. 13 is thereby obtained.

With a high order interpolating operation process, such as the cubic spline interpolating operation process, the interpolating operation can be performed such that the image may not become unsharp and the original image reproducible range may not be affected adversely. When the array of the pixels represented by the checkered sampling image signal, which array is shown in FIG. 3, is compared with the array of the pixels represented by the square sampling image signal, which has the signal values also at the pixel positions indicated by the "X" mark, the frequency characteristics of the image represented by the checkered sampling image signal are inclined in the direction rotated by an angle of 45 degrees with respect to the frequency characteristics of the image represented by the square sampling image signal. In the second embodiment of the image processing apparatus in accordance with the present invention, the interpolating operation process is performed with the interpolation filter F0 shown in FIG. 13, which has the array of the filter factors obtained by rotating the array of the filter factors in the interpolation filter shown in FIG. 14 for the cubic spline interpolating operation process by an angle of 45 degrees, and by utilizing only the signal values of the image signal S1, which correspond to the pixel positions indicated by the "O" mark. Therefore, as in the cases where the filtering process with the interpolation filter shown in FIG. 14 is performed on the image signal, which has been acquired through the sampling in the square sampling pattern, the new square sampling image signal S1' can be obtained, such that the image may not become unsharp and the original image reproducible range may not be lost.

Figure 15:
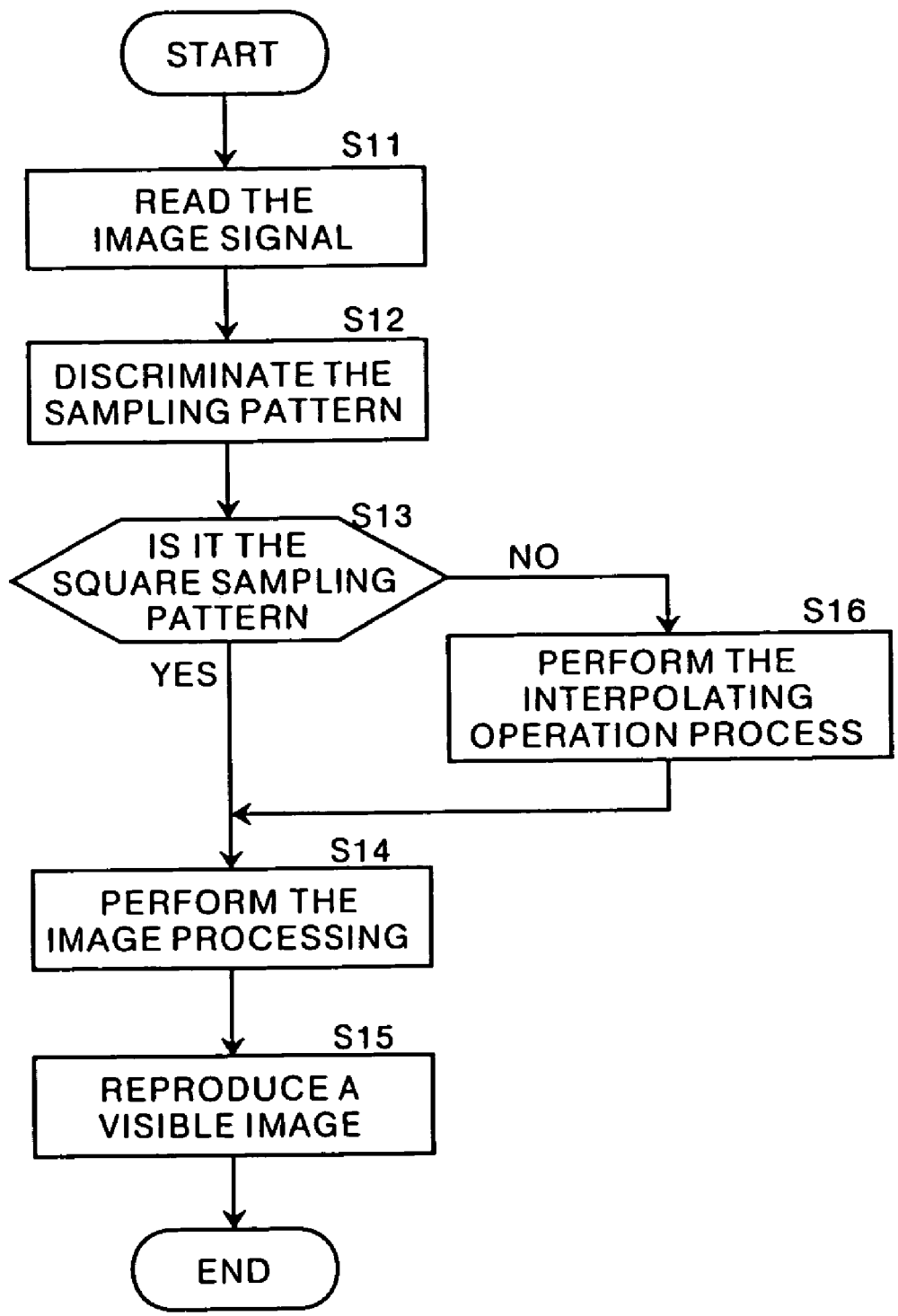
FIG. 15 is a flow chart showing how the second embodiment of FIG. 11 operates.
Figure 18A:
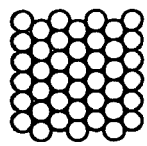
FIG. 18A is an explanatory view showing a pixel array employed in checkered sampling.
Figure 18B:
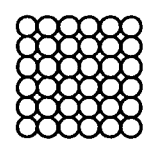
FIG. 18B is an explanatory view showing a pixel array employed in square sampling.
Figure 19A:
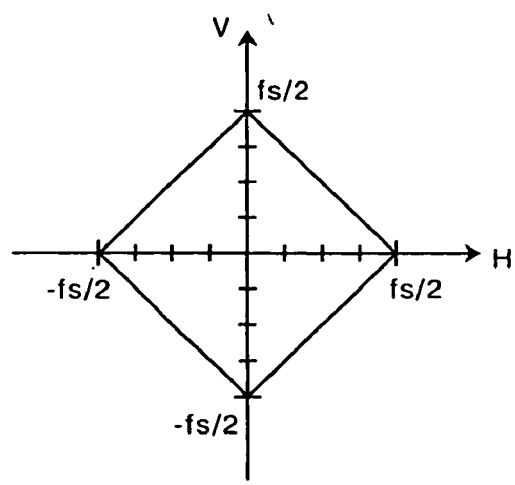
FIG. 19A is a graph showing frequency characteristics of a checkered sampling image signal.
Figure 19B:
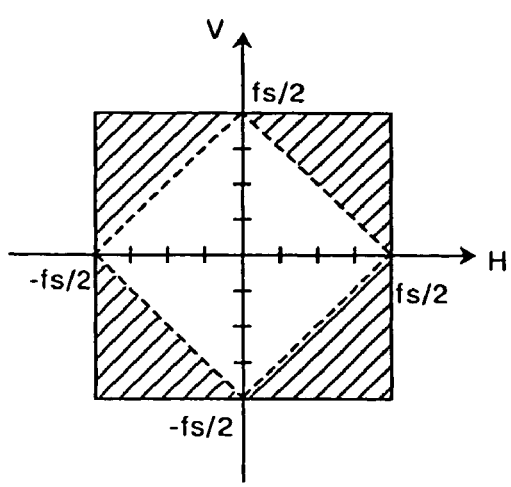
FIG. 19B is a graph showing frequency characteristics of a square sampling image signal.

How the second embodiment of the image processing apparatus in accordance with the present invention operates will be described hereinbelow. FIG. 15 is a flow chart showing how the second embodiment of FIG. 11 operates. As illustrated in FIG. 15, in a step S11, the image signal S1, which has been acquired with the image acquiring means 6, and the sampling information J appended to the image signal S1 are read by the image signal reading means 1. The image signal S1 is fed into the image processing means 23, and the sampling information J is fed into the discrimination means 2. In a step S12, the discrimination means 2 discriminates in accordance with the sampling information J whether the sampling pattern employed at the time of the image pickup in the image acquiring means 6 is the checkered sampling pattern or the square sampling pattern. In cases where it has been discriminated in the step S12 that the sampling pattern employed at the time of the image pickup in the image acquiring means 6 is the square sampling pattern, the question in a step S13 is affirmed. In such cases, in a step S14, only the image processing with the processing means 13 is performed on the image signal S1 by the image processing means 23, and the processed image signal S3 is obtained. Finally, in a step S15, a visible image is reproduced from the processed image signal S3 by the image reproducing means 4.

In cases where it has been discriminated in the step S12 that the sampling pattern employed at the time of the image pickup in the image acquiring means 6 is the checkered sampling pattern, the question in the step S13 is denied. In such cases, in a step S16, the interpolating operation process with the interpolation filter F0 is performed on the image signal S1 by the transforming processing means 12, and the new square sampling image signal S1' is obtained. Also, in the step S14, the image processing is performed on the new square sampling image signal S1' by the processing means 13, and the processed image signal S3 is obtained. Finally, in the step S15, a visible image is reproduced from the processed image signal S3 by the image reproducing means 4.

As described above, in the second embodiment of the image processing apparatus in accordance with the present invention, in cases where it has been discriminated in accordance with the sampling information J, which concerns the sampling pattern employed at the time of the image pickup, that the image was picked up through sampling in the checkered sampling pattern, the interpolating operation process with the interpolation filter F0, which interpolating operation process is different from the interpolating operation process performed in the image acquiring means 6, is performed to form the new signal values, which correspond to the pixel positions indicated by the "X" mark, and thereby to obtain the new square sampling image signal S1'. Therefore, the new square sampling image signal S1', which represents the image sharper than the image represented by the image signal S1, can be obtained. Accordingly, in cases where the image processing is performed on the new square sampling image signal S1', an image having good image quality with high sharpness can be obtained.

Figures 16, 17:
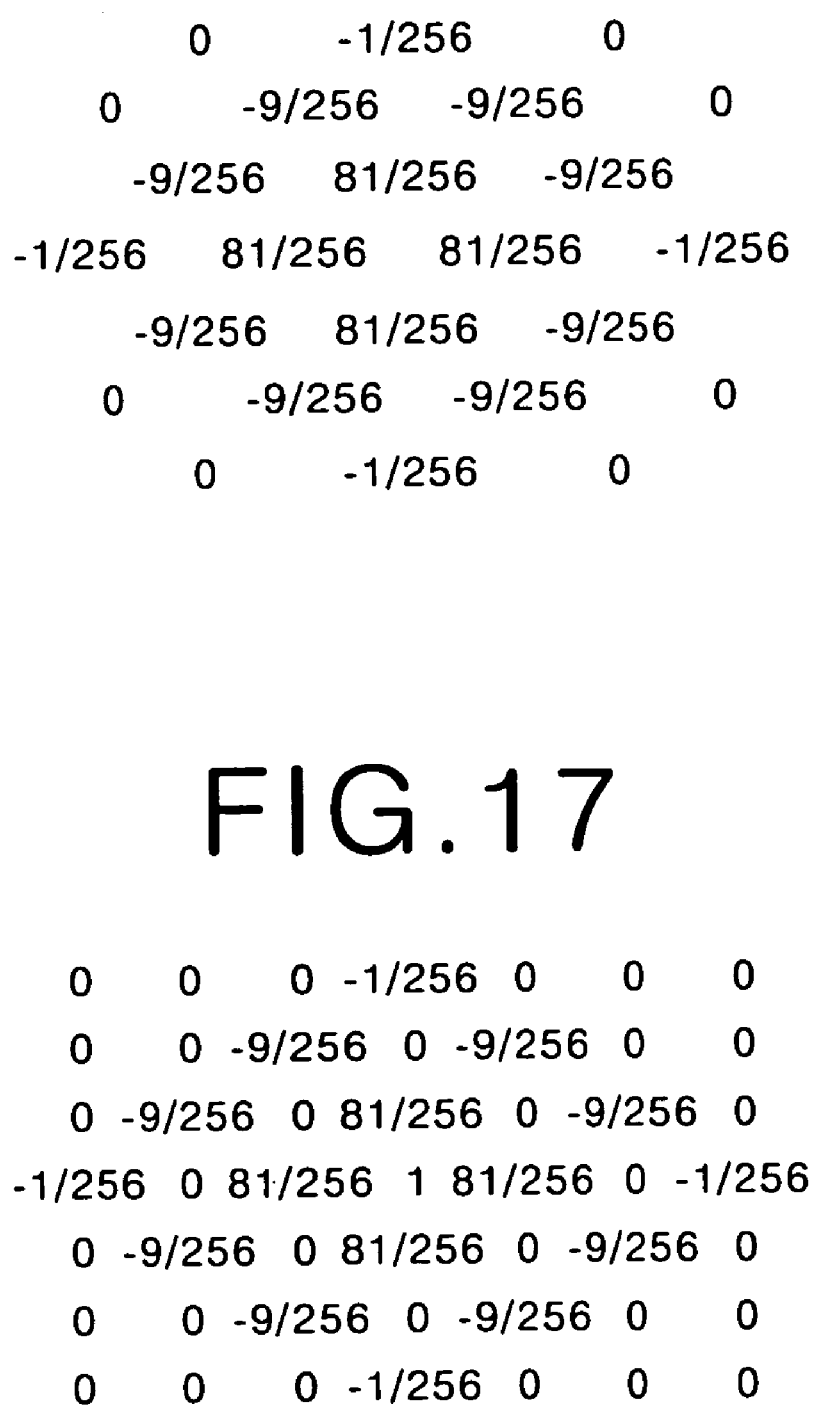

In the aforesaid second embodiment of the image processing apparatus in accordance with the present invention, the interpolating operation process with the interpolation filter F0 shown in FIG. 13 is performed by the transforming processing means 12. Alternatively, as illustrated in FIG. 16, the interpolation filter, in which the value of 0 is utilized and the filter factors are arrayed in the checkered form, may be utilized in the transforming processing means 12. As another alternative, as illustrated in FIG. 17, a square interpolation filter may be utilized, in which the value of 0 is inserted between the filter factors of the interpolation filter F0. In cases where the interpolation filter illustrated in FIG. 16 or FIG. 17 is utilized, the amount of calculations for the multiplication by the value of 0 becomes large. However, for example, in cases where a special-purpose operation device for product sum operations, such as a digital signal processor (DSP), is provided in the image processing apparatus, the calculations may be made only with simple product sum operations. In such cases, the processing can be performed quickly. Therefore, even if the amount of operations become large, by the utilization of the special-purpose operation device for product sum operations, the filtering process with the interpolation filter can be performed comparatively quickly, and the new square sampling image signal S1' can thereby be obtained.

Also, in the aforesaid second embodiment of the image processing apparatus in accordance with the present invention, the interpolation filter for performing the cubic spline interpolating operation process is employed. Alternatively, one of various interpolation filters for performing high order interpolating operation processes, such as a B spline interpolating operation process and a Lagrange interpolating operation process, may be employed. Further, the interpolation filter is not limited to the 4×4 interpolation filter, and one of various N×M interpolation filters, in which at least either one of N and M is at least 3, may be employed.

Furthermore, in the first and second embodiments of the image processing apparatus in accordance with the present invention, the image processing apparatus is provided in the image output system. Alternatively, the image processing apparatus in accordance with the present invention may be provided in an image pickup device, such as a digital camera or a scanner for reading out an image from film. As another alternative, the image processing apparatus in accordance with the present invention may be provided in an image output device, such as a monitor or a printer, for reproducing a visible image from the image signal having been obtained from the image pickup device. As a further alternative, the image processing apparatus in accordance with the present invention may take on the form of a single independent unit.

The second embodiment of the image processing apparatus in accordance with the present invention, which is described above with reference to FIG. 11 through FIG. 17, embraces an embodiment of the first image transforming apparatus in accordance with the present invention.

As described above, in the embodiment of the first image transforming apparatus in accordance with the present invention, in cases where it has been discriminated in accordance with the sampling information J, which concerns the sampling pattern employed at the time of the image pickup, that the image was picked up through sampling in the checkered sampling pattern, the interpolating operation process with the interpolation filter F0, which interpolating operation process is different from the interpolating operation process performed in the image acquiring means 6, is performed to form the new signal values, which correspond to the pixel positions indicated by the "X" mark, and thereby to obtain the new square sampling image signal S1'. Therefore, the new square sampling image signal S1', which represents the image sharper than the image represented by the image signal S1, can be obtained. Accordingly, in cases where the image processing is performed on the new square sampling image signal S1', an image having good image quality with high sharpness can be obtained.

Also, in the embodiment of the first image transforming apparatus in accordance with the present invention, wherein the sampling information J, which concerns the sampling pattern employed at the time of image pickup, is appended to the square sampling image signal S1, reference may be made to the sampling information J, and it can be found immediately whether the square sampling image signal S1 is the one which was originally acquired through the checkered sampling or is the one which was originally acquired through the square sampling. Therefore, a judgment can be made easily as to whether the interpolating operation process for obtaining the new square sampling image signal S1' should be or should not be performed.

In the embodiment of the first image transforming apparatus in accordance with the present invention, the interpolating operation process with the interpolation filter F0 is performed in the transforming processing means 12. Alternatively, a filtering process may be performed with respect to the horizontal direction of the image by utilizing only the signal values corresponding to the pixel positions indicated by the "O" mark in FIG. 3, and the signal values corresponding to the pixel positions indicated by the "X" mark in FIG. 3 may thereby be calculated. Thereafter, the filtering process may be performed in the same manner with respect to the vertical direction of the image. In this manner, the signal values corresponding to all of the pixel positions indicated by the "X" mark in FIG. 3 may thereby be calculated.

Figure 20A:
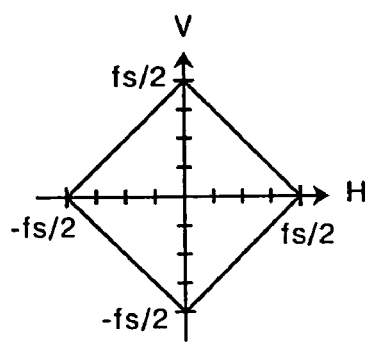
FIG. 20A is a graph showing frequency characteristics of a checkered sampling image signal.
Figure 20B:
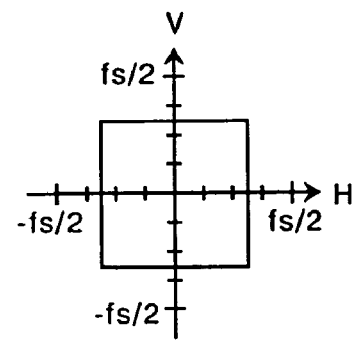
FIG. 20B is a graph showing filter characteristics in a filtering process performed with respect to horizontal and vertical directions of an image.
Figure 20C:
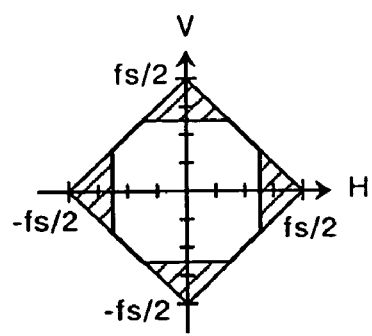
FIG. 20C is a graph showing frequency ranges lost due to the filtering process performed with the filter characteristics shown in FIG. 20B.
Figure 20D:
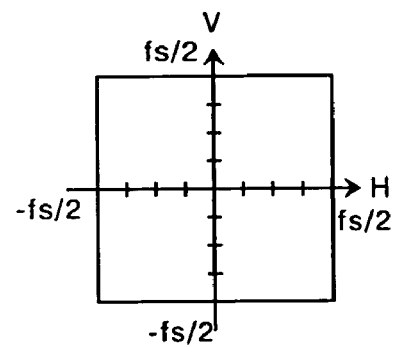
FIG. 20D is a graph showing a different example of filter characteristics in a filtering process performed with respect to horizontal and vertical directions of an image.
Figure 20E:
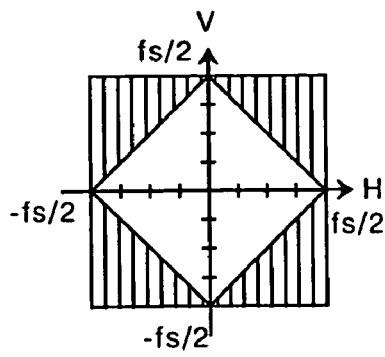
FIG. 20E is a graph showing how an aliasing strain occurs due to the filtering process performed with the filter characteristics shown in FIG. 20D.

In cases where the frequency characteristics of the checkered sampling image signal are represented in two-dimensional directions, the frequency characteristics may be represented as a rhombic response illustrated in FIG. 20A. Also, in cases where the filtering process is performed with respect to the horizontal direction of the image and thereafter the filtering process is performed with respect to the vertical direction of the image in the manner described above, the frequency characteristics of the thus obtained image signal may be represented as a rectangular response illustrated in FIG. 20B. In FIG. 20B, fs/2 represents a Nyquist frequency of the square sampling image signal. In FIG. 20A, image-reproducible frequency bands for the checkered sampling image are indicated by the solid lines. In FIG. 20B, the positions, at which the filter response becomes equal to ½, are indicated by the solid lines. Therefore, in cases where the filtering process with respect to the horizontal direction of the image and the filtering process with respect to the vertical direction of the image are performed on the checkered sampling image signal in the manner described above, the range obtained by multiplying the frequency characteristics shown in FIG. 20A by the frequency characteristics shown in FIG. 20B represents the frequency bands which the image obtained from the filtering process can reproduce. However, in such cases, the regions indicated by the hatching in FIG. 20C are lost due to the filtering process, and therefore the original image reproducible range is affected adversely. Accordingly, it may be considered to alter the filter characteristics and to alter the positions, at which the filter response becomes equal to ½, as illustrated in FIG. 20D. However, in such cases, the regions hatched in FIG. 20E go beyond the characteristics shown in FIG. 20A, and an aliasing strain will occur. As a result, aliasing occurs, and the image quality of the obtained image becomes bad. In order for the aforesaid problems to be eliminated, the interpolating operation process should preferably be performed with the interpolation filter F0. In cases where the interpolating operation process is performed with the interpolation filter F0, the interpolating operation process can be performed such that the image may not become unsharp and the original image reproducible range may not be affected adversely.

In the embodiment of the first image transforming apparatus in accordance with the present invention, the sampling information J is appended to the image signal S1 in the image acquiring means 6, and the discrimination means 2 discriminates in accordance with the sampling information J whether the sampling pattern employed at the time of the image pickup in the image acquiring means 6 is the checkered sampling pattern or the square sampling pattern. In cases where it is known that all of the image signals S1, S1, . . . are the ones which were acquired by picking up the images through sampling in the checkered sampling pattern, the sampling information J need not necessarily be appended to the image signal S1. Also, the discrimination means 2 need not necessarily make the discrimination as to whether the sampling pattern employed at the time of the image pickup in the image acquiring means 6 is the checkered sampling pattern or the square sampling pattern, and the processing in the image processing means 23 may be performed directly.

Further, in the embodiment of the first image transforming apparatus in accordance with the present invention, the first image transforming apparatus is provided in the image output system. Alternatively, the first image transforming apparatus in accordance with the present invention may be provided in an image pickup device, such as a digital camera or a scanner for reading out an image from film. As another alternative, the first image transforming apparatus in accordance with the present invention may be provided in an image output device, such as a monitor or a printer, for reproducing a visible image from the image signal having been obtained from the image pickup device. As a further alternative, the first image transforming apparatus in accordance with the present invention may take on the form of a single independent unit.

An embodiment of the second image transforming apparatus in accordance with the present invention will be described hereinbelow.

Figure 21:
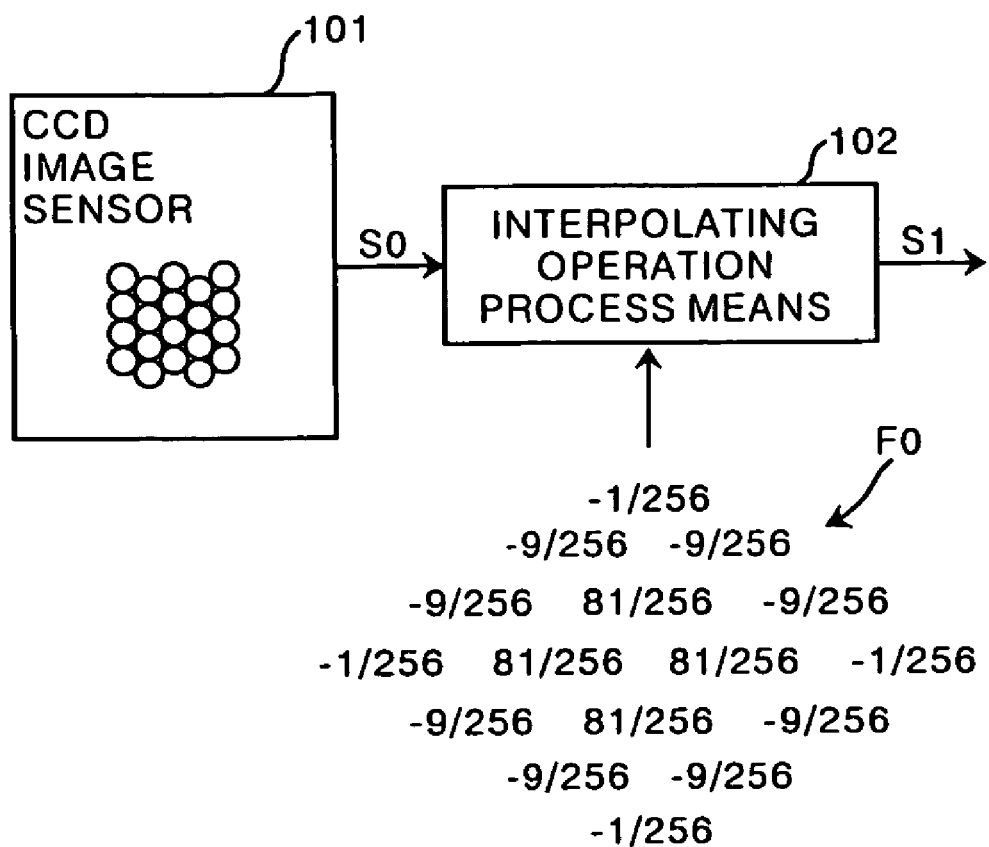
FIG. 21 is a block diagram showing an embodiment of the second image transforming apparatus in accordance with the present invention.

FIG. 21 is a block diagram showing an embodiment of the second image transforming apparatus in accordance with the present invention. With reference to FIG. 21, the embodiment of the second image transforming apparatus in accordance with the present invention comprises interpolating operation process means 102 for performing an interpolating operation process on the image signal S0, which is the checkered sampling image signal obtained from a CCD image sensor 101 having pixels arrayed in the checkered pattern, and thereby transforming the checkered sampling image signal S0 into the square sampling image signal S1.

Alternatively, the second image transforming apparatus in accordance with the present invention may be provided in an image pickup device, such as a digital camera or a scanner for reading out an image from film. As another alternative, the second image transforming apparatus in accordance with the present invention may be provided in an image output device, such as a monitor or a printer, for reproducing a visible image from the image signal having been obtained from the image pickup device. As a further alternative, the second image transforming apparatus in accordance with the present invention may take on the form of a single independent unit.

As illustrated in FIG. 21, the CCD image sensor 101 has the checkered pixel array, in which the pixels arrayed along the horizontal lines (or the vertical lines) are shifted by a length corresponding to one half of a pixel between adjacent lines.

In the interpolating operation process means 102, the interpolating operation process is performed on the image signal S0 in the manner described below. As illustrated in FIG. 3, in cases where the image signal S0 is the one having been acquired through the sampling in the checkered sampling pattern, the pixel positions in the pixel array shown in FIG. 3, which are indicated by the "O" mark, have signal values, and the pixel positions indicated by the "X" mark (hereinbelow referred to as the empty pixel positions) have no signal value. Therefore, in order for the signal values corresponding to the empty pixel positions to be calculated, the interpolating operation process means 102 performs a filtering process with the interpolation filter F0, which has the factors illustrated in FIG. 21, on the image signal S0. In this manner, the square sampling image signal S1 is obtained. The filtering process is the convolutional operation performed on the filter factors of the interpolation filter F0 and the signal values corresponding to the pixel positions indicated by the "O" mark.

Figures 22, 23:
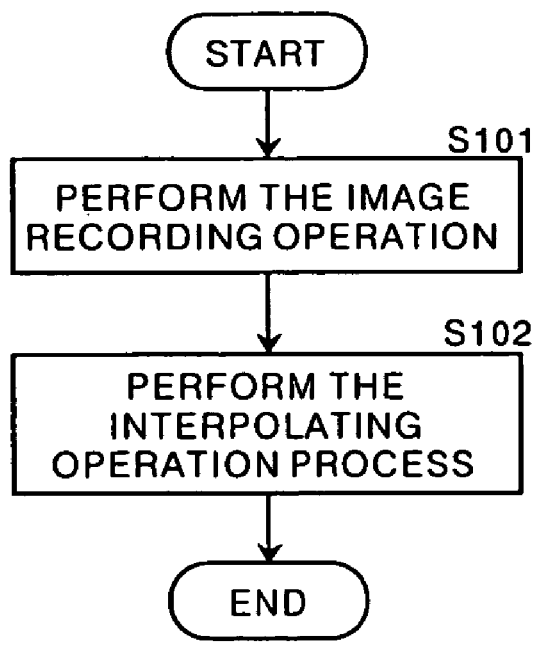
FIG. 22 is an explanatory view showing an interpolation filter employed in a two-dimensional cubic spline interpolating operation process.
FIG. 23 is a flow chart showing how the embodiment of the second image transforming apparatus shown in FIG. 21 operates.

The interpolation filter F0 is formed in the manner described below. Specifically, the interpolation factors of the one-dimensional cubic spline interpolating operation process for calculating a signal value corresponding to the middle point of four pixels are $-1/16$, $9/16$, $9/16$, and $-1/16$. Therefore, as illustrated in FIG. 22, when the interpolation factors are developed in two-dimensional directions, an interpolation filter constituted of a 4×4 factor matrix is obtained. The array of the filter factors of the interpolation filter is rotated by an angle of 45 degrees, and the interpolation filter F0 having the array of the filter factors illustrated in FIG. 21 is thereby obtained.

With a high order interpolating operation process, such as the cubic spline interpolating operation process, the interpolating operation can be performed such that the image may not become unsharp and the original image reproducible range may not be affected adversely. When the array of the pixels represented by the checkered sampling image signal, which array is shown in FIG. 3, is compared with the array of the pixels represented by the square sampling image signal, which has the signal values also at the pixel positions indicated by the "X" mark, the frequency characteristics of the image represented by the checkered sampling image signal are inclined in the direction rotated by an angle of 45 degrees with respect to the frequency characteristics of the image represented by the square sampling image signal. In the embodiment of the second image transforming apparatus in accordance with the present invention, the interpolating operation process is performed on the checkered sampling image signal S0 and with the interpolation filter F0 shown in FIG. 21, which has the array of the filter factors obtained by rotating the array of the filter factors in the interpolation filter shown in FIG. 22 for the cubic spline interpolating operation process by an angle of 45 degrees. Therefore, as in the cases where the filtering process with the interpolation filter shown in FIG. 22 is performed on the image signal, which has been acquired through the sampling in the square sampling pattern, the square sampling image signal S1 can be obtained, such that the image may not become unsharp and the original image reproducible range may not be lost.

How the embodiment of the second image transforming apparatus in accordance with the present invention operates will be described hereinbelow. FIG. 23 is a flow chart showing how the embodiment of the second image transforming apparatus in accordance with the present invention operates. As illustrated in FIG. 23, in a step S101, an image recording operation is performed with the CCD image sensor 101, and the checkered sampling image signal S0 is obtained. The image signal S0 is fed into the interpolating operation process means 102. In a step S102, in the interpolating operation process means 102, the filtering process with the interpolation filter F0 is performed on the image signal S0, the signal values corresponding to the empty pixel positions indicated by the "X" mark in FIG. 3 are calculated, and the square sampling image signal S1 is thereby obtained. With the step S102, the processing is finished.

In the aforesaid embodiment of the second image transforming apparatus in accordance with the present invention, the interpolating operation process with the interpolation filter F0 shown in FIG. 21 is performed by the interpolating operation process means 102. Alternatively, as illustrated in FIG. 16, the interpolation filter, in which the value of 0 is utilized and the filter factors are arrayed in the checkered form, may be utilized in the interpolating operation process means 102. As another alternative, as illustrated in FIG. 17, a square interpolation filter may be utilized, in which the value of 0 is inserted between the filter factors of the interpolation filter F0. In cases where the interpolation filter illustrated in FIG. 16 or FIG. 17 is utilized, the amount of calculations for the multiplication by the value of 0 becomes large. However, for example, in cases where a special-purpose operation device for product sum operations, such as a digital signal processor (DSP), is provided in the second image transforming apparatus, the calculations may be made only with simple product sum operations. In such cases, the processing can be performed quickly. Therefore, even if the amount of operations become large, by the utilization of the special-purpose operation device for product sum operations, the filtering process with the interpolation filter can be performed comparatively quickly, and the square sampling image signal S1 can thereby be obtained.

Also, in the aforesaid embodiment of the second image transforming apparatus in accordance with the present invention, the interpolation filter for performing the cubic spline interpolating operation process is employed. Alternatively, one of various interpolation filters for performing high order interpolating operation processes, such as a B spline interpolating operation process and a Lagrange interpolating operation process, may be employed. Further, the interpolation filter is not limited to the 4×4 interpolation filter, and one of various N×M interpolation filters, in which at least either one of N and M is at least 3, may be employed.

Further, in the aforesaid embodiment of the second image transforming apparatus in accordance with the present invention, the interpolating operation process is performed on the image signal S0 having been acquired with the CCD image sensor 101. The interpolating operation process can also be performed in the same manner on an image signal having been acquired with a scanner for photoelectrically reading out the image. In such cases, in the scanner, the sample holding positions may be shifted by a length corresponding to one half of a pixel with respect to each scanning line, and the image signal S0 may thereby be acquired as the checkered sampling image signal.

The second image transforming apparatus in accordance with the present invention is also applicable to the image output system, which is described above with reference to FIG. 11 through FIG. 17 and in which the second embodiment of the image processing apparatus in accordance with the present invention is employed.

In addition, all of the contents of Japanese Patent Application Nos. 11(1999)-212201, 11(1999)-232674, 2000-155703, 2000-155687, and 2000-155648 are incorporated into this specification by reference.

What is claimed is:

1. An image pickup device, comprising:
means for picking up an image through sampling in a predetermined sampling pattern to acquire an image signal representing the image, the predetermined sampling pattern being one of a first and second type of sampling pattern;
sampling information appending means for appending sampling information, which concerns the predetermined sampling pattern, to the image signal, which has been acquired; and
processing means for choosing between different types of sharpness enhancement processing in accordance with the sampling information, and performing the chosen type of sharpness enhancement processing on the acquired image signal to obtain a processed image signal.

2. An image pickup device, comprising:
transforming processing means for performing transforming processing on a square sampling image signal, which has been obtained from a checkered sampling image signal by performing a predetermined interpolating operation process on the checkered sampling image signal to form signal values corresponding to empty pixel positions in an array of pixels represented by image signal components of the checkered sampling image signal,
wherein the transforming processing means performs the transforming processing for performing an interpolating operation process, which is different from the predetermined interpolating operation process, on the square sampling image signal to form new signal values corresponding to the empty pixel positions, in lieu of the signal values having been formed with the predetermined interpolating operation process, and thereby to obtain a new square sampling image signal.

3. An image pickup device, comprising:
transforming processing means for performing transforming processing on a square sampling image signal, which has been obtained from a checkered sampling image signal by performing a predetermined interpolating operation process on the checkered sampling image signal to form signal values corresponding to empty pixel positions in an array of pixels represented by image signal components of the checkered sampling image signal,
wherein the transforming processing means performs the transforming processing for performing an interpolating operation process, which is different from the predetermined interpolating operation process, on the square sampling image signal to form new signal values corresponding to the empty pixel positions, in lieu of the signal values having been formed with the predetermined interpolating operation process, and thereby to obtain a new square sampling image signal,
wherein sampling information, which represents whether an image represented by an original image signal has been picked up through checkered sampling or square sampling, is appended to the square sampling image signal; and
discrimination means for discriminating in accordance with the sampling information whether the image has been picked up through the checkered sampling or not, and the transforming processing means performs the processing for performing the different interpolating operation process to obtain the new square sampling image signal only in cases where it has been discriminated by the discrimination means that the image has been picked up through the checkered sampling.

4. An image pickup device, comprising:
transforming means for transforming a checkered sampling image signal into a square sampling image signal,
wherein the transforming means transforms the checkered sampling image signal into the square sampling image signal by performing a filtering process on the checkered sampling image signal and with an interpolation filter, which has an array of filter factors obtained by rotating an array of filter factors in a N×M high order interpolation filter, where at least either one of N and M is at least 3, by an angle of 45 degrees.

5. An image pickup device, comprising:
an image sensor for picking up an image through sampling in a predetermined sampling pattern to acquire an image signal representing the image, the predetermined sampling pattern being one of a first and second type of sampling pattern;
a sampling information appending unit for appending sampling information, which concerns the predetermined sampling pattern, to the image signal, which has been acquired; and
an image processing unit for choosing between different types of sharpness enhancement processing in accordance with the sampling information, and performing the chosen type of sharpness enhancement processing on the acquired image signal to obtain a processed image signal.

6. An image pickup device, comprising:
a transforming processing unit for performing transforming processing on a square sampling image signal, which has been obtained from a checkered sampling image signal by performing a predetermined interpolating operation process on the checkered sampling image signal to form signal values corresponding to empty pixel positions in an array of pixels represented by image signal components of the checkered sampling image signal, wherein the transforming processing unit performs the transforming processing for performing an interpolating operation process, which is different from the predetermined interpolating operation process, on the square sampling image signal to form new signal values corresponding to the empty pixel positions, in lieu of the signal values having been formed with the predetermined interpolating operation process, and thereby to obtain a new square sampling image signal.

7. An image pickup device, comprising:

a transforming processing unit for performing transforming processing on a square sampling image signal, which has been obtained from a checkered sampling image signal by performing a predetermined interpolating operation process on the checkered sampling image signal to form signal values corresponding to empty pixel positions in an array of pixels represented by image signal components of the checkered sampling image signal, wherein the transforming processing unit performs the transforming processing for performing an interpolating operation process, which is different from the predetermined interpolating operation process, on the square sampling image signal to form new signal values corresponding to the empty pixel positions, in lieu of the signal values having been formed with the predetermined interpolating operation process, and thereby to obtain a new square sampling image signal, wherein sampling information, which represents whether an image represented by an original image signal has been picked up through checkered sampling or square sampling, is appended to the square sampling image signal; and a discrimination unit for discriminating in accordance with the sampling information whether the image has been picked up through the checkered sampling or not, and the transforming processing unit performs the processing for performing the different interpolating operation process to obtain the new square sampling image signal only in cases where it has been discriminated by the discrimination unit that the image has been picked up through the checkered sampling.

8. An image pickup device, comprising:

a transforming unit for transforming a checkered sampling image signal into a square sampling image signal, wherein the transforming unit transforms the checkered sampling image signal into the square sampling image signal by performing a filtering process on the checkered sampling image signal and with an interpolation filter, which has an array of filter factors obtained by rotating an array of filter factors in a N×M high order interpolation filter, where at least either one of N and M is at least 3, by an angle of 45 degrees.

* * * * *